(12) United States Patent
Hijikata et al.

(10) Patent No.: US 7,162,349 B2
(45) Date of Patent: Jan. 9, 2007

(54) DRIVING ASSIST SYSTEM AND METHOD WITH ACCELERATOR PEDAL REACTION FORCE CONTROL

(75) Inventors: Shunsuke Hijikata, Kanagawa (JP); Tomohiro Yamamura, Yokohama (JP); Satoshi Kitazaki, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 576 days.

(21) Appl. No.: 10/336,802

(22) Filed: Jan. 6, 2003

(65) Prior Publication Data

US 2003/0135317 A1 Jul. 17, 2003

(30) Foreign Application Priority Data

Jan. 10, 2002 (JP) ............................. 2002-003803

(51) Int. Cl.
*G06F 19/00* (2006.01)

(52) U.S. Cl. ..................... 701/70; 701/36; 701/301; 340/436; 340/903

(58) Field of Classification Search ................. 701/70, 701/96, 36, 301; 340/435, 436, 903; 180/167, 180/169, 170
See application file for complete search history.

(56) References Cited

U.S. PATENT DOCUMENTS

| 5,748,476 | A | 5/1998 | Sekine et al. | |
|---|---|---|---|---|
| 6,076,034 | A | 6/2000 | Satoh et al. | |
| 6,542,793 | B1 * | 4/2003 | Kojima et al. | 701/1 |
| 2003/0060936 | A1 * | 3/2003 | Yamamura et al. | 701/1 |
| 2003/0163240 | A1 * | 8/2003 | Egami | 701/96 |
| 2003/0176960 | A1 * | 9/2003 | Yamamura | 701/36 |
| 2003/0187578 | A1 * | 10/2003 | Nishira et al. | 701/301 |
| 2003/0233187 | A1 * | 12/2003 | Egami | 701/96 |
| 2003/0236602 | A1 * | 12/2003 | Kuge et al. | 701/36 |
| 2004/0249549 | A1 | 12/2004 | Kondoh et al. | |

(Continued)

FOREIGN PATENT DOCUMENTS

DE 196 20 929 A 11/1997

(Continued)

OTHER PUBLICATIONS

Related U.S. Appl. No. 10/226,232, filed Aug. 23, 2002 (Our Ref. No. 50353-598).

*Primary Examiner*—Gary Chin
(74) *Attorney, Agent, or Firm*—McDermott Will & Emery LLP

(57) ABSTRACT

A driving assist system for assisting manual effort by an operator to operate an accelerator pedal of a motor vehicle, the driving assist system comprises a data acquisition subsystem acquiring data including information on state of the motor vehicle and information on environment in a field around the motor vehicle. Control logic determines the degree of risk in the field around the motor vehicle in response to the acquired data. An actuator is provided, which is operable in response to a command for generating reaction force at the accelerator pedal. Control logic simply increases an increment of reaction force between a first reaction force increment and a second reaction force increment as the determined degree of risk grows from a predetermined cutoff value to a predetermined critical value to determine the command for regulating the actuator to realize the increment in reaction force. The first reaction force increment has a first magnitude in an area of a lower limit of a predetermined range, in magnitude, of increment in reaction force, which the vehicle operator can perceive through the sense of touch during depressing the accelerator pedal. The second reaction force increment has a second magnitude in an area of an upper limit of the predetermined range.

16 Claims, 18 Drawing Sheets

U.S. PATENT DOCUMENTS

2004/0249550 A1   12/2004   Yamaura et al.

FOREIGN PATENT DOCUMENTS

| EP | 0 348 691 A2 | 1/1990 |
| EP | 0 617 674 B1 | 4/1996 |
| JP | 10-166889 | 6/1998 |
| JP | 10-166890 | 6/1998 |
| JP | 2000-54860 | 2/2000 |
| WO | WO 99/58358 | 11/1999 |
| WO | WO 00/05093 | 2/2000 |

* cited by examiner

US 7,162,349 B2

DRIVING ASSIST SYSTEM AND METHOD WITH ACCELERATOR PEDAL REACTION FORCE CONTROL

BACKGROUND OF THE INVENTION

1. Field of the Invention

The present invention relates to driving assist systems and methods for assisting manual efforts by operators to operate vehicles in traveling.

2. Description of the Background Art

There is a need for a driving assist system, which can reliably assist manual effort by an operator to operate a vehicle, such as, an automobile, in traveling. Various driving assist systems of the above kind are known. One example is disclosed in JP-A 10-166889. This known system allows the amount of reaction force at accelerator pedal to increase immediately after the intervehicle spacing has become narrow. The known system determines the amount of such increase in response to a current value of the amount of depression of an accelerator pedal and/or a current value of rate of depression of the accelerator pedal. Another example is disclosed in JP-A 10-166890. This known system allows the amount of reaction force at accelerator pedal to increase immediately after the intervehicle spacing has become narrow. This known system determines the amount of such increase in response to the intervehicle spacing such that the amount of such increase rises as the intervehicle spacing becomes narrower. Other example is disclosed in JP P2000-54860A. This known system determines the amount of reaction force at accelerator pedal so as to maintain the depressed position by the vehicle operator during automatic cruising control and applies the determined reaction force to the accelerator pedal.

The known driving assist systems are satisfactory to some extent. However, a need remains for development of driving assist system and method that can keep a vehicle operator informed of varying environment in a field around a motor vehicle in such a manner as to assist the manual effort by the operator to operate the vehicle in driving.

An object of the present invention is to provide driving assist system and method to meet the above-mentioned need.

SUMMARY OF THE INVENTION

The present invention provides, in one aspect thereof, a driving assist system for assisting manual effort by an operator to operate a vehicle, the driving assist system comprising:

a data acquisition sub-system acquiring data including information on state of the motor vehicle and information on environment in a field around the motor vehicle;

control logic for determining the degree of risk in the field around the motor vehicle in response to the acquired data;

an actuator operable in response to a command for generating reaction force at the accelerator pedal; and control logic for simply increasing an increment of the reaction force between a first reaction force increment and a second reaction force increment as the determined degree of risk grows from a predetermined cutoff value to a predetermined critical value to determine the command for regulating the actuator to realize the increment in the reaction force, the first reaction force increment having a first magnitude in an area of a lower limit of a predetermined range, in magnitude, of increment in said reaction force, which the vehicle operator can perceive through the sense of touch during depressing the accelerator pedal, the second reaction force increment having a second magnitude in an area of an upper limit of the predetermined range.

BRIEF DESCRIPTION OF THE DRAWINGS

The present invention will be apparent from reading of the following description in conjunction with the accompanying drawings.

DETAILED DESCRIPTION OF THE INVENTION

Motor vehicles are equipped with input devices like a steering wheel, an accelerator pedal and a brake pedal. In traveling a motor vehicle, the vehicle operator perceives environment or situation in a field around the vehicle through normal senses of seeing and hearing. The vehicle operator applies manual effort to the accelerator pedal sending a power request command to a prime mover such as an internal combustion engine or an electric traction motor. In various exemplary implementations of the present invention, the vehicle operator can perceive environment or situation in the field through a sense of touch. With reference to various embodiments of a driving assist system, the present invention will be described. In the embodiments, the magnitude of reaction force of the accelerator pedal is adjusted so that the vehicle operator may continuously recognize environment or situation in the field around the vehicle through sense of touch. As the discussion proceeds, the reader will recognize considerable contribution, which the present invention may make, to reduction in the strain of driving. The vehicle operator suffers from the strain of driving particularly in the foggy environment.

FIGS. 1 to 10 illustrate one exemplary implementation of the present invention.

Figure 1:
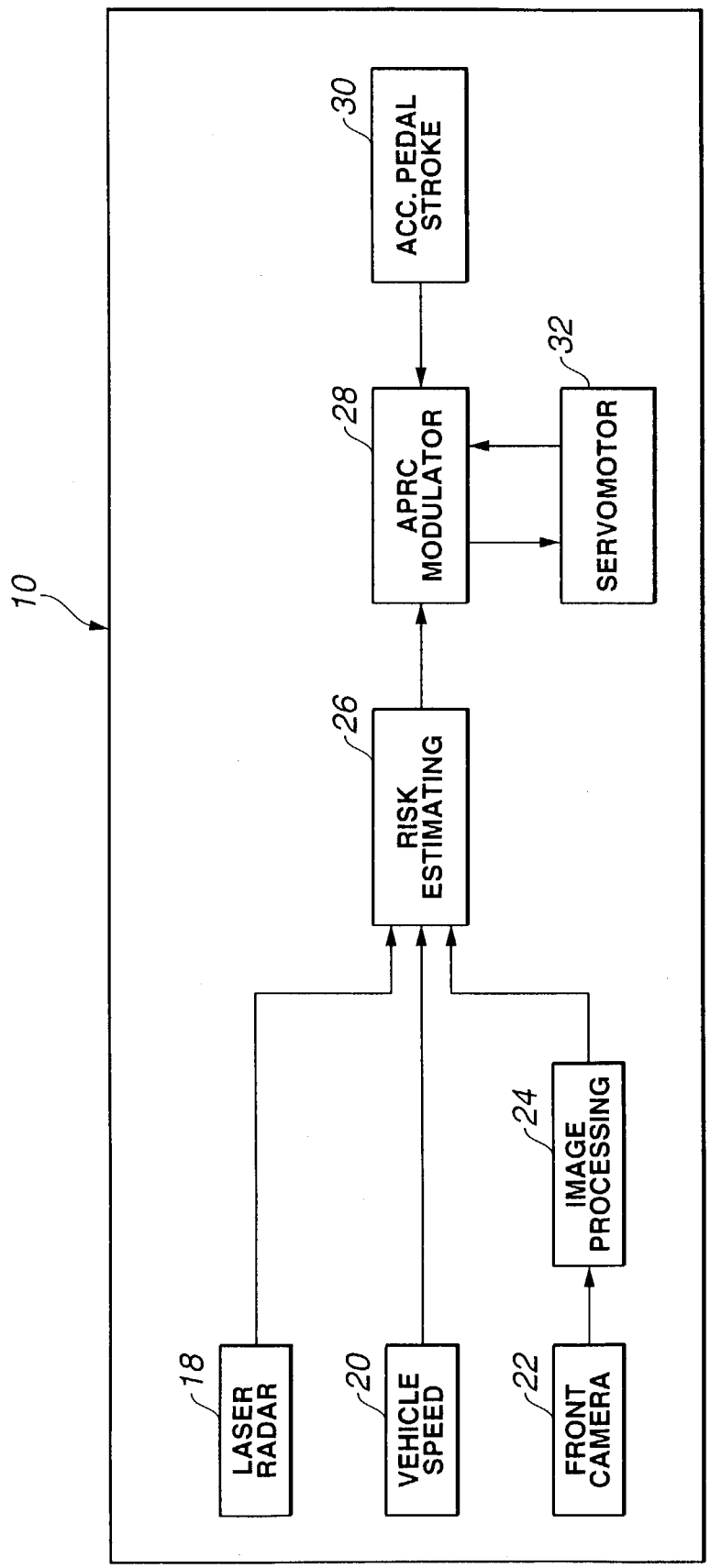
FIG. 1 is a control diagram showing control of one exemplary implementation of a driving assist system according to the present invention.
Figure 2:
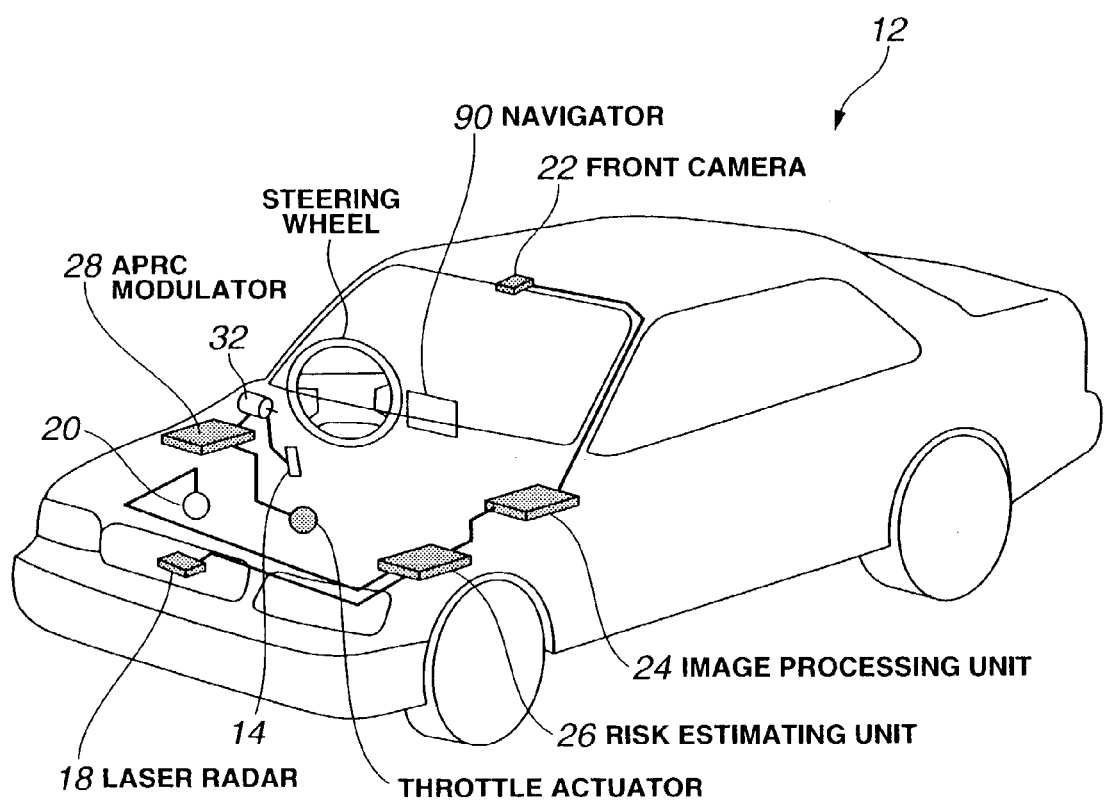
FIG. 2 is a view illustrating how hardware of the implementation in FIG. 1 is arranged on a motor vehicle.

With reference now to FIGS. 1 and 2, the reference numeral 10 generally indicates a driving assist system for a motor vehicle 12. The driving assist system 10 assists vehicle operator by varying the magnitude of reaction force perceived via an accelerator pedal 14 with different degrees of risk in a field around the vehicle 12. The driving assist system 10 includes a data acquisition system (DAS) 16 arranged on the vehicle 12. The DAS 16 continuously acquires data including information on the state of vehicle 12 and information on environment in the field around the vehicle 12.

As shown in FIG. 1, the DAS 16 includes laser radar 18, a source of vehicle speed 20, a front camera 22, and an image processing unit 24. The present invention is operable with millimeter wave radar or other type radar in the place of the laser radar 18.

As shown in FIG. 2, the laser radar 18 is mounted to the vehicle 12 at a front bumper or a front grille thereof. It scans horizontally and laterally about 6 degrees to each side of an axis parallel to the vehicle longitudinal centerline, propagates infrared pulses forwardly and receives the reflected radiation by an obstacle, such as, a rear bumper of a leading vehicle. The laser radar 18 can provide distances to vehicles in front of the vehicle 12 and angular locations of the preceding vehicles.

The source of vehicle speed 20 may determine vehicle velocity by processing outputs from wheel speed sensors. The source of vehicle speed 20 may include an engine controller or a transmission controller, which can provide a signal indicative of the vehicle velocity.

The front camera 22 of the CCD or CMOS type is mounted to the vehicle 12 in the vicinity of the internal rear view mirror. It acquires image data of a region in front of the vehicle. The region extends from a camera axis laterally to each side by about 30 degrees. The image-processing unit 24 receives the image data for processing, including filtering and pattern recognition.

The laser radar 18, source of vehicle speed and image processing unit 24 output signals as acquired data by the DAS 16.

The acquired data are used to compute the degree of risk P, which the vehicle operator perceives from the environment in the space around the vehicle 12. The driving assist system 10 includes a risk-estimating unit 26 in the form of a microprocessor-based controller to compute the degree of risk P. Briefly describing on the function to compute the degree of risk P, the controller 26 recognizes the preceding vehicle to follow by using the image data from the front camera 22 to select one out of the plurality of preceding vehicles scanned by the laser radar 18. The risk-estimating unit 26 determines a distance and a relative speed to the preceding vehicle and computes the degree of risk P based on the determined distance and relative speed. Further description on how to compute the degree of risk P will be made later.

The degree of risk P is used as one input to an accelerator pedal reaction characteristic (APRC) modulator 28. An accelerator pedal stroke is used as another input to the APRC modulator 28. Such information on accelerator pedal stroke is obtained from an accelerator pedal stroke sensor 30. The APRC modulator 28 provides pattern of variation of reaction force with different depressed positions in such a manner as to let the vehicle operator continuously perceive necessary information on the degree of risk P via the accelerator pedal 14. Further description on this variation pattern of reaction force will be made later. The APRC modulator 28 generates an accelerator pedal reaction force command and applies it to a servomotor 32.

Figure 3:
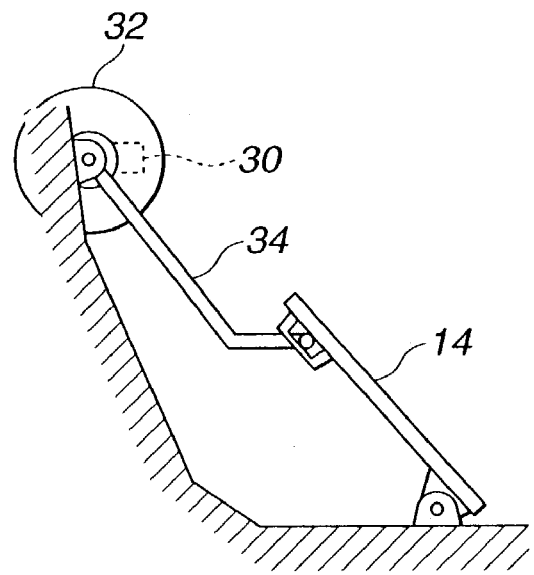
FIG. 3 is a schematic view of a servomotor of an accelerator reaction characteristic modulation actuator in operative relationship with an accelerator pedal.

With reference now to FIG. 3, a link mechanism 34 operatively interconnects the servomotor 32 and the accelerator pedal 14. In an embodiment, the servomotor 32 has embedded therein the accelerator pedal stroke sensor 30. The accelerator pedal stroke sensor 30 measures an angle of depression of the accelerator pedal 14 in terms of a rotary angle through which the servomotor 32 is forced to turn by the link mechanism 34 in response to the depression. The accelerator pedal stroke sensor 30 applies the measure of rotary angle, as sensor output, to the APRC modulator 28. The APRC modulator 28 computes a current value of stroke of the accelerator pedal 14 out of the measure of rotary angle. In response to the degree of risk P, the APRC modulator 28 computes a value of reaction force to be generated at the accelerator pedal 14 in a manner to be described later. The APRC modulator 28 determines a value of accelerator pedal reaction force command for accomplishment of the computed value of reaction force at the accelerator pedal 14. It regulates the servomotor 32 in rotary angle and torque to adjust the current valve of reaction force to the computed value of reaction force. In this manner, the APRC modulator 28 can adjust the reaction force at the accelerator pedal 14 to any desired value.

The following sections provide description on how to compute the degree of risk P at the risk estimating unit 26.

For the purpose of description only, we use the reference character P1 to designate the degree of risk used in this exemplary implementation.

The risk estimating unit 26 recognizes the distance D to the preceding vehicle, vehicle speed V1 of the following vehicle 12, and vehicle speed V2 of the preceding vehicle. Using such recognized data, the risk-estimating unit 26 computes the degree of risk P1. In the exemplary implementation, the degree of risk P1 is expressed as a sum of a first extent and a second extent. The first extent represents how much the vehicle 12 has approached the preceding vehicle, which it is following. The second extent represents how much an unpredictable change in motion of the preceding vehicle might have influence upon the following vehicle 12. As the discussion proceeds, it will be understood that the first extent is determined as a function of the reciprocal of time to collision (TTC), and the second extent is determined as a function of the reciprocal of time headway (THW).

We introduced the notion of time to collision (TTC). The TTC is a measure of time from a current moment to a future moment when the intervehicle spacing would become zero if the relative speed remains unaltered. The TTC is expressed as:

$$TTC = \frac{D}{V1 - V2} \qquad \text{Eq. 1}$$

where: D is the distance to the preceding vehicle or intervehicle spacing between the preceding and following vehicles;

V1 is the vehicle speed of the following vehicle 12; and

V2 is the vehicle speed of the preceding vehicle, which the vehicle 12 is following.

The smaller the value of TTC, the more imminent is the collision and the larger is the value of the first extent. As mentioned before, the reciprocal of TTC determines the first extent. In a traffic scene where a vehicle is following another vehicle on a highway, most vehicle operators perceived a high degree of risk and initiated deceleration to avoid collision well before the TTC becomes less than 4 seconds. To some extent, the TTC is a good indication for predicting a future behavior the vehicle operator might take. However, when it comes to quantifying the degree of risk, which the vehicle operator actually perceives, there is discrepancy between the TTC and the degree of risk. Thus, the TTC alone is insufficient to quantify the degree of risk.

Such discrepancy may be confirmed by considering a traffic scene where the relative speed is zero. In this case, the TTC is infinite irrespective of how narrow the intervehicle spacing D is. However, the vehicle operator perceives an increase in the degree of risk in response to a reduction in the intervehicle spacing D, accounting for an increase how much an unpredictable drop in vehicle speed V2 of the preceding vehicle might have influence upon the TTC.

To remedy the above-mentioned discrepancy, we introduced the notion of time headway (THW) to quantify an increase how much an unpredictable drop in vehicle speed V2 of the preceding vehicle might have influence upon the TTC in a traffic scene where one vehicle is following another vehicle within a constant intervehicle spacing. The THW is expressed as, $$THW = \frac{D}{V1} \qquad \text{Eq. 2}$$

The THW is a measure of a timer that is set to count when the leading vehicle reaches a point on a road and will be reset subsequently when the following vehicle will reach the same point. The relationship between the two notions is such that when a change in vehicle speed V2, if any, of the preceding vehicle results in a small change in the TTC when the THW is long, but the same change in vehicle speed V2 results in a large change in the TTC when the THW is short.

The risk-estimating unit 26 determines the degree of risk P1 by computing the sum of the first and second extents. In exemplary implementation, as mentioned before the reciprocal of TTC determines the first extent, and the reciprocal of THW determines the second extent. The degree of risk P1 is expressed as, $$P1 = \frac{a}{THW} + \frac{b}{TTC} \qquad \text{Eq. 3}$$

where: b and a (b>a) are parameters weighting 1/TTC and 1/THW, respectively, such that 1/THW is less weighted than 1/TTC. The values of b and a are optimized after accounting for a statistics of values of THW and TTC collected in a traffic scene including one vehicle is following another vehicle. In this implementation, b=8 and a=1.

The degree of risk P1 can provide quantitative expression as to how much a following vehicle has approached the preceding vehicle continuously over varying of environment from a state where the intervehicle spacing is unaltered to a state where the intervehicle spacing is narrowing. Flatly speaking, the degree of risk P1 increases as the risk perceived by the vehicle operator grows. It follows that the degree of risk P1 represents how much risk grows within the vehicle operator. The risk-estimating unit 26 provides, as an output, the degree of risk P1.

The degree of risk P1 is used as an input of the APRC modulator 28. Another input of the APRC modulator 28 is a pedal position of the accelerator pedal 14, which will be hereinafter called an accelerator pedal position S.

In the implementation of the present invention, the servomotor 32 includes the accelerator pedal stroke sensor 30. This sensor 30 detects the magnitude of each stroke of the accelerator pedal 14 and provides the detected magnitude of accelerator pedal stroke as the accelerator pedal position S. The accelerator pedal stroke sensor 30 provides the accelerator pedal position S used in the APRC modulator 28.

Figure 4:
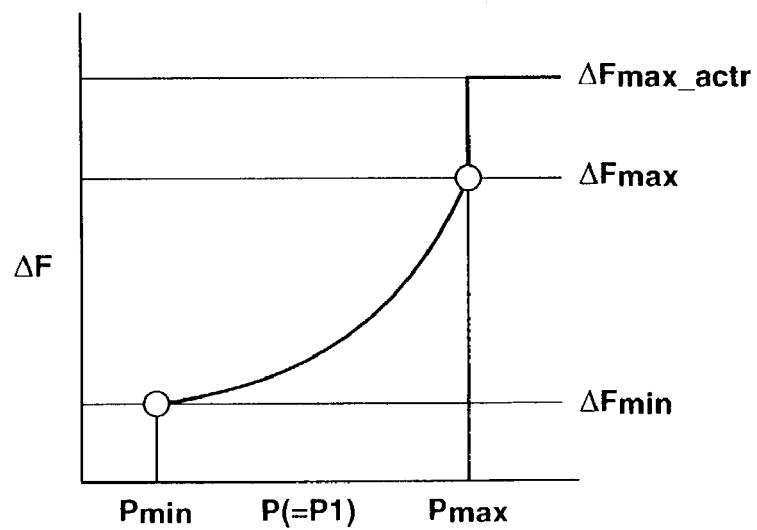
FIG. 4 is a graph, illustrating one exemplary varying of an increment $\Delta F$ in accelerator pedal reaction force with different degrees of risk P
Figure 5:
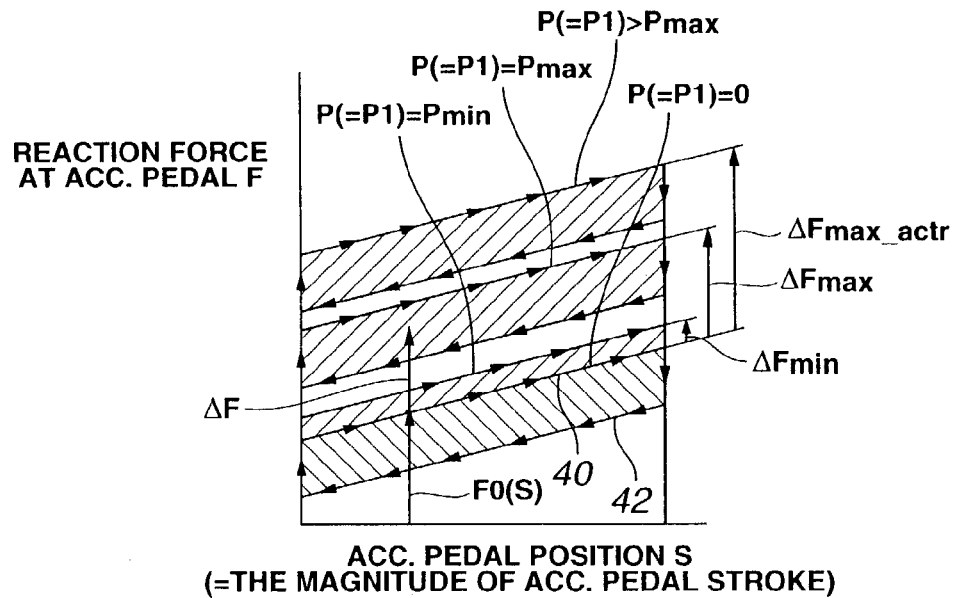
FIG. 5 is a reaction force map.
Figure 6:
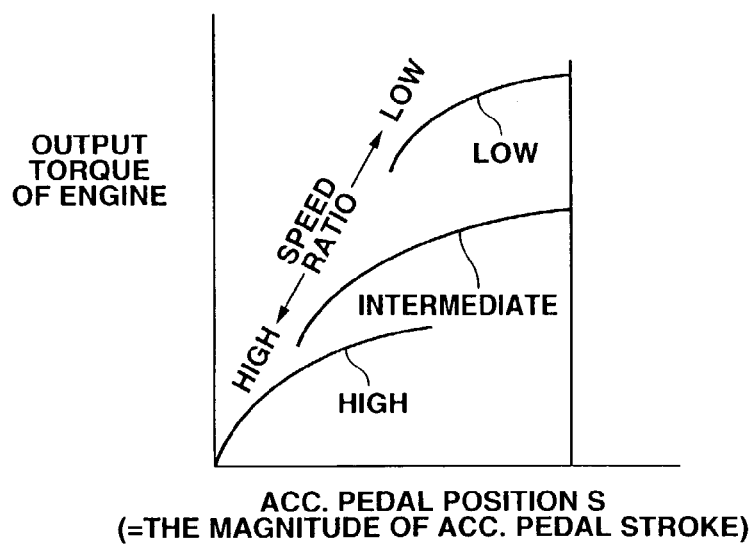
FIG. 6 is an engine torque map.

With reference now to FIGS. 4, 5 and 6, the APRC modulator 28 determines a reaction force base F0(S) as a hysteresis function of accelerator pedal position S and it also determines an increment ΔF as a predetermined function of degree of risk P1. Using the reaction force base F0(S) and the increment ΔF, it determines a reaction force at accelerator pedal F.

FIG. 5 illustrates a reaction force map including a typical example of a hysteresis function. The hysteresis function permits the reaction force base F0(S) to increase along a straight line 40 during depression of the accelerator pedal 14, and to decrease along another straight line 42 during the subsequent release of it. The relationship is such that, with the same value of accelerator pedal position S, the straight line 40 provides a higher value than the straight line 42 does. These values of the reaction force base F0(S) determine, unmodified, values of the reaction force at accelerator pedal F when the degree of risk P (=P1 in this example) is zero.

FIG. 4 illustrates a typical example of the predetermined function according to the exemplary implementation. In FIG. 4, the horizontal axis represents the degree of risk P (=P1 in this example), and the vertical axis represents the increment ΔF. If every low degree of risk P should be expressed in terms of an increment of reaction force at accelerator pedal, most vehicle operators might feel uneasy. This concern prompted the inventors to introduce the notation of a high pass gate to neglect such low degrees of risk P. According to the implementation of the present invention, there is provided a cutoff value Pmin. If the degree of risk P falls below the cutoff value Pmin, then the increment ΔF is zero. If the degree of risk P grows continuously from the cutoff value Pmin, there is a critical value above which considerably high degree of risk P will be predicted, requiring the vehicle operator to release of the accelerator pedal 14 to initiate action to decelerate the vehicle. According to the implementation of the present invention, there is provided such critical value Pmax. Of course, the critical value Pmax is greater than the cutoff value Pmin. Accounting for requirements on each fleet of motor vehicles, these two values in the degree of risk P may be determined and preset.

There is a low threshold below which the magnitude of increment ΔF in accelerator pedal reaction force cannot be felt or perceived through the sense of touch. There is a range, in magnitude, of reaction force increment ΔF, which many vehicle operators can perceive through the sense of touch although they are not prompted to release the accelerator pedal 14. According to the implementation of the present invention, there is provided, as a minimum reaction force increment ΔFmin, one magnitude in an area of the range lower limit, which area is immediate to the low threshold. The implementation coordinates this minimum reaction force increment ΔFmin with the cutoff value Pmin in the degree of risk P. According to the implementation of the present invention, there is provided as a maximum reaction force increment ΔFmax, another magnitude in an area of the range upper limit. The implementation coordinates this maximum reaction force increment ΔFmax with the critical value Pmax in the degree of risk P.

According to the implementation of the present invention, a simple function permits the reaction force increment ΔF to continuously increase from the minimum ΔFmin to the maximum ΔFmax as the degree of risk P increases from the cutoff value Pmin to the critical value Pmax. In the embodiment, an exponential like function governs the reaction force increment ΔF and it is expressed as, $$\Delta F = A \cdot P^n \qquad \text{Eq. 4}$$

where: A and n are constants, which are adjusted to interconnect one point (Pmin, ΔFmin) and another point (Pmax, ΔFmax).

This function gives a continuous and smooth varying of reaction force increment ΔF between the minimum ΔFmin and the maximum ΔFmax with different degrees of risk P over the range Pmin and Pmax. With selection of appropriate values as A and n, this function permits adjustment of reaction force varying characteristic in a manner to nicely communicate the various degrees of risk P to the vehicle operator in terms of accelerator pedal reaction force. Thus, the vehicle operator is always well informed of varying degrees of risk P in terms pedal reaction force. The constants A and n may vary with different types of vehicles. The implementation of the present invention requires setting of constants A and n through field test by, for example, drive simulation only for adjustment to desired varying of accelerator pedal reaction force with different degrees of risk P.

With continuing reference to FIG. 4, the implementation of the present invention permits the reaction force increment ΔF to jump up to an upper limit increment ΔFmax_actr when or immediately after the degree of risk P has grown to or exceeded the critical value Pmax. The upper limit increment ΔFmax_actr is greater than the maximum ΔFmax, and it may take a desired one out of values available in the accelerator pedal operable range. According to the implementation of the present invention, this jump prompts the vehicle operator to release the accelerator pedal 14. Besides, this jump makes the vehicle operator to fully recognize the growing risk. With regard to the timing, the occurrence of the reaction force increment ΔF as much as the upper limit increment ΔFmax_actr begins at the moment when or immediately after or upon elapse of a predetermined small delay after the degree of risk P has grown to or exceeded the critical value Pmax.

The reaction force map in FIG. 5 indicates that, in usual state where there is no reaction force increment ΔF, depressing the accelerator pedal 14 causes an increase in the reaction force at accelerator pedal F along the line 40. As mentioned before, the implementation of the present invention has the hysteresis function that provides the reaction force base F0(S). When there is no degree of risk P, the reaction force base F0(S) makes the reaction force at accelerator pedal F, causing the reaction force at accelerator pedal F to vary as it does in the usual state.

The APRC modulator 28 determines the reaction force base F0(S) in response to the accelerator pedal position S from the graph illustrated in FIG. 5. Using the characteristic illustrated in FIG. 4, it determines the reaction force increment ΔF in response to the degree of risk P. From the reaction force base F0(S) and increment ΔF, it determines the reaction force at accelerator pedal F which is expressed as, $$F = f(P, S) = \Delta F + F0(S) \qquad \text{Eq. 5}$$

The APRC modulator 28 determines a servomotor command in response to the determined reaction force at accelerator pedal F. It applies the servo motor command to the servomotor 32, causing it to produce force as much as the determined reaction force F. The vehicle operator can perceive by the sense of touch the degree of risk P through the increment ΔF that has been added to the reaction force base F0(S).

With reference to FIG. 6, the implementation of the present invention permits the engine to produce torque that varies with different values of accelerator pedal position S. With the same gear ratio, depressing the accelerator pedal 14 causes the engine to increase its output torque. Thus, increasing the reaction force to at least restrain the depression of the accelerator pedal 14 can suppress an increase in output torque. As shown in FIG. 6, with the same accelerator pedal position S, the output torque increases as gear ratio shifts toward low gear.

Figure 7A:
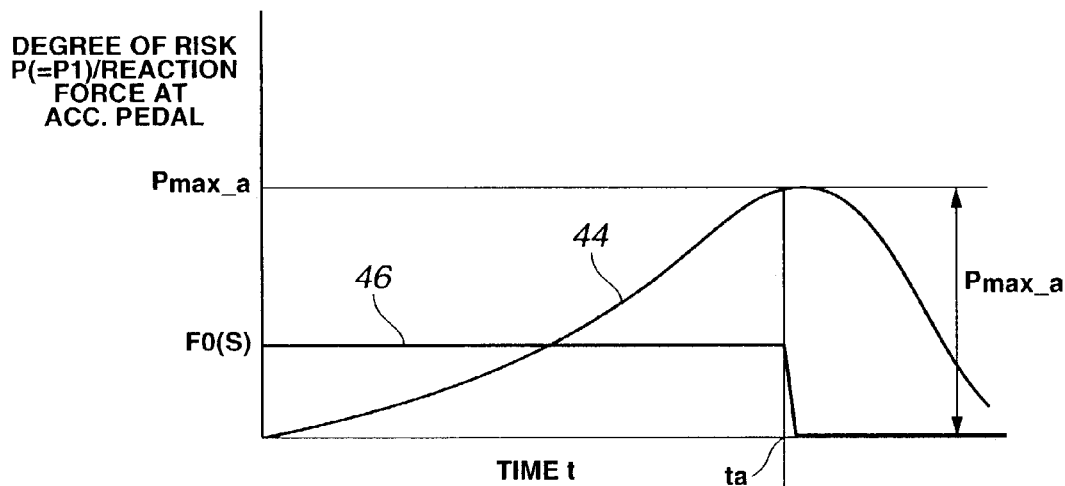
FIGS. 7A and 7B are timing diagrams illustrating operation without the exemplary implementation of the present invention.
Figure 7B:
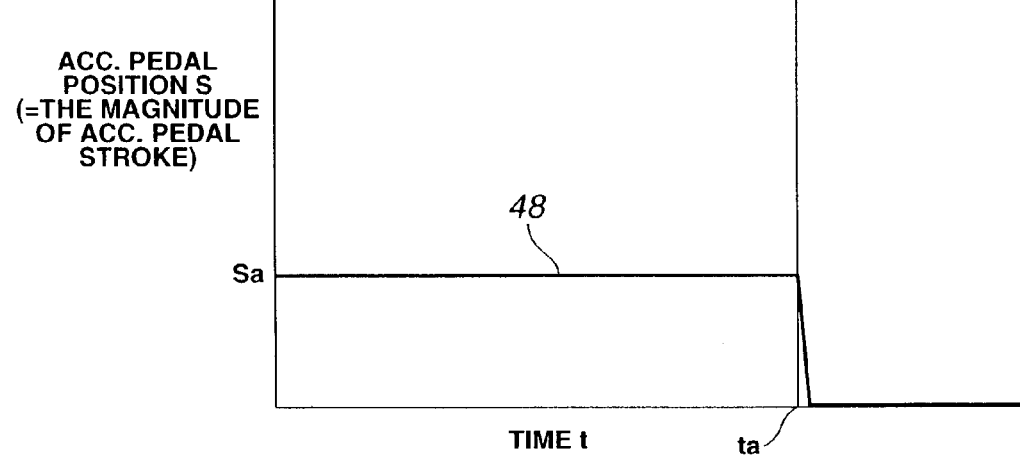
Figure 8A:
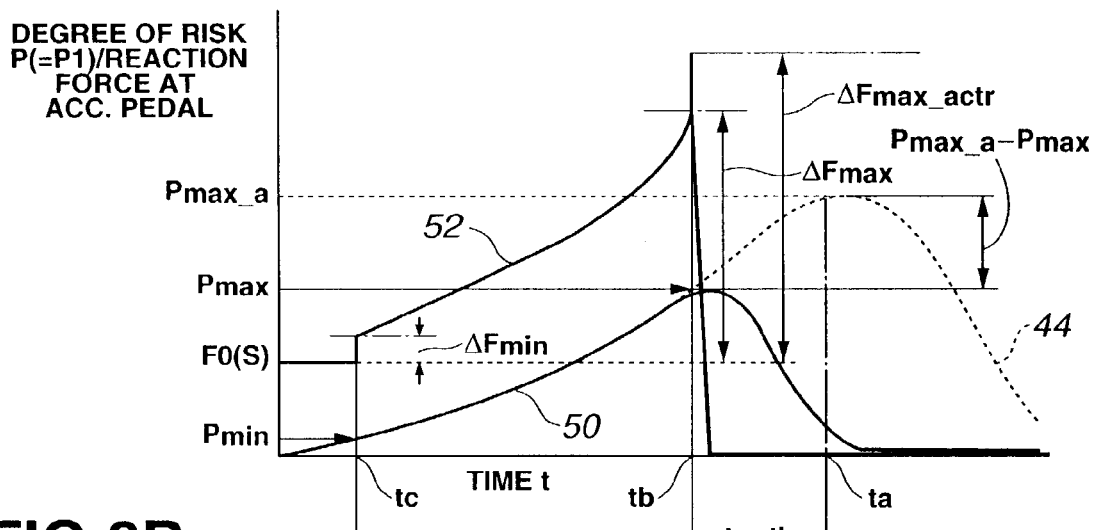
FIGS. 8A and 8B are timing diagrams illustrating operation with the exemplary implementation of the present invention.
Figure 8B:
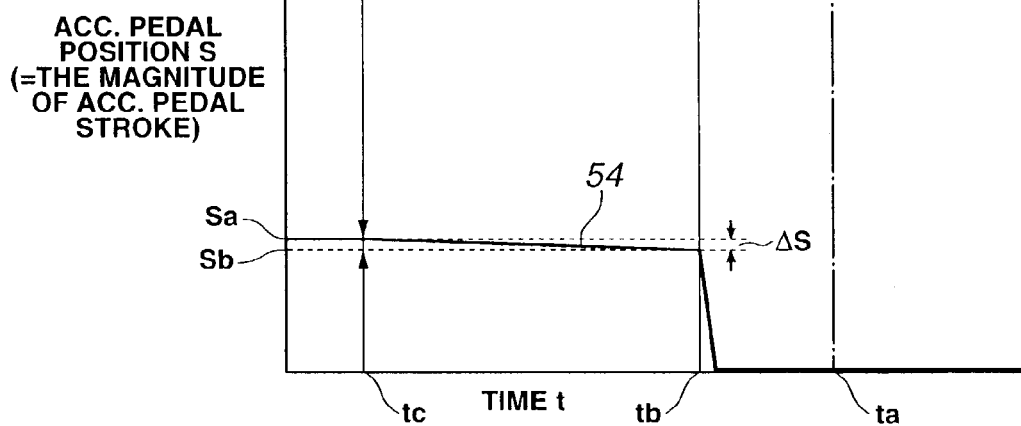

With reference now to FIGS. 7A, 7B, 8A and 8B, it is now assumed that, with the accelerator pedal depressed, the vehicle 12 is approaching the preceding vehicle. FIGS. 7A and 7B are timing diagrams illustrating the situation without the implementation of the present invention. FIGS. 8A and 8B are timing diagrams illustrating the situation with the implementation of the present invention. FIGS. 7A and 8A show varying of reaction force with time together with varying of degree of risk with time. FIGS. 7B and 8B show varying of accelerator pedal position with time.

In FIG. 7A, a curve 44 shows how the degree of risk P grows during approaching the preceding vehicle. A line 46 shows varying of reaction force at accelerator pedal F with time. In FIG. 7B, a line 48 shows varying of accelerator pedal position S with time. Prior to the moment $t_a$, the vehicle operator keeps on depressing the accelerator pedal to an accelerator pedal position Sa against the usual reaction force F0(S), and the degree of risk P is growing because the vehicle is approaching the preceding vehicle. At the moment $t_a$ when the degree of risk P grows to a limit value Pmax_a, the vehicle operator releases the accelerator pedal upon perceiving the growing risk.

In FIG. 8A, the curve 44 is shown in dotted line. The fully drawn curve 50 shows how the degree of risk P grows during approaching the preceding vehicle. According to the implementation of the present invention, the risk-estimating unit 26 computes the degree of risk P. A line 52 shows varying of reaction force at accelerator pedal F with time. In FIG. 8B, a line 54 shows varying of accelerator pedal position S with time. Prior to the moment $t_c$, the vehicle operator keeps on depressing the accelerator pedal to an accelerator pedal position Sa against reaction force F0(S), and the degree of risk P is growing because the vehicle is approaching the preceding vehicle. At the moment $t_c$ when the degree of risk P grows to the critical value Pmin, the APRC modulator 28 sets the minimum reaction force increment $\Delta$Fmin is used as the increment $\Delta$F to be added to the reaction force base F0(S). Subsequently after the moment $t_c$ till the moment $t_b$, the degree of risk P continues to grow, causing the increment $\Delta$F to increase from the minimum $\Delta$Fmin, thus causing the reaction force at accelerator pedal F to increase as illustrated by the line 52. It is remembered that the degree of risk P determines the increment $\Delta$F as defined by the equation 4. During this period $t_c$ and $t_b$, the increment $\Delta$F continuously increases toward the maximum $\Delta$Fmax, augmenting reaction force at accelerator pedal F in a manner to make the vehicle operator to continuously perceive the degree of risk P that grows toward the critical value Pmax. The accelerator pedal returns from the depressed position Sa owing to the increase in reaction force during this period $t_c$ and $t_b$ as shown in FIG. 8B. At the moment $t_b$ when the degree of risk P has grown to the critical value Pmax, the increment $\Delta$F is equal to the maximum $\Delta$Fmax, prompting the vehicle operator to release the accelerator pedal. In order to forcibly prompt the vehicle operator to release the accelerator pedal, the implementation of the present invention provides a further arrangement. According to this further arrangement, the reaction force increment $\Delta$F to jump when or immediately after the degree of risk P has grown to or exceeded the critical value Pmax.

Figure 9:
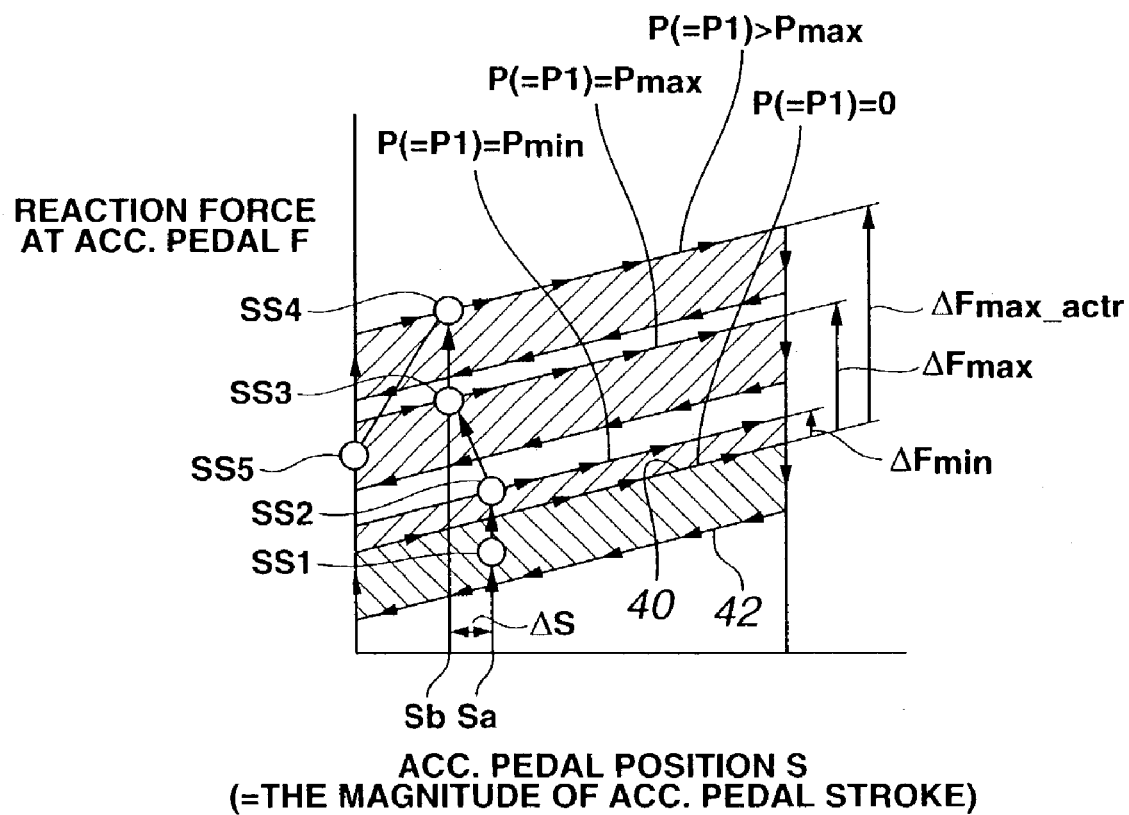
FIG. 9 is the same view as FIG. 5, illustrating one mode of operation according to the implementation of the present invention.

With reference also to FIG. 9, the accelerator pedal is assumed to be returned by AS from the position Sa to Sb during period $t_c$ to $t_b$. In FIG. 9, path through point SS1 to point SS2 illustrates reaction force vs., accelerator pedal position relationship till the moment $t_c$. Path from point SS2 to point SS3 illustrates reaction force vs., accelerator pedal position relationship from the moment $t_c$ to $t_b$. Path from point SS3 to SS4 illustrates reaction force vs., accelerator pedal position relationship during the jump at or immediately after the moment $t_b$ for forcibly prompting the vehicle operator to release the accelerator pedal. Path from the point SS4 to point SS5 illustrates reaction force vs., accelerator pedal position relationship during releasing the accelerator pedal.

Comparing FIG. 8A to FIG. 7A reveals that the implementation of the present invention prompts the vehicle operator to release the accelerator pedal at the moment $t_b$ when the degree of risk P has grown to the maximum Pmax that is less than the limit value Pmax_a at which the vehicle operator is prompted to release the accelerator pedal at the moment $t_a$ according to the prior art. The moment $t_b$ is in advance of the moment $t_a$ by $t_a$–$t_b$.

Figure 10:
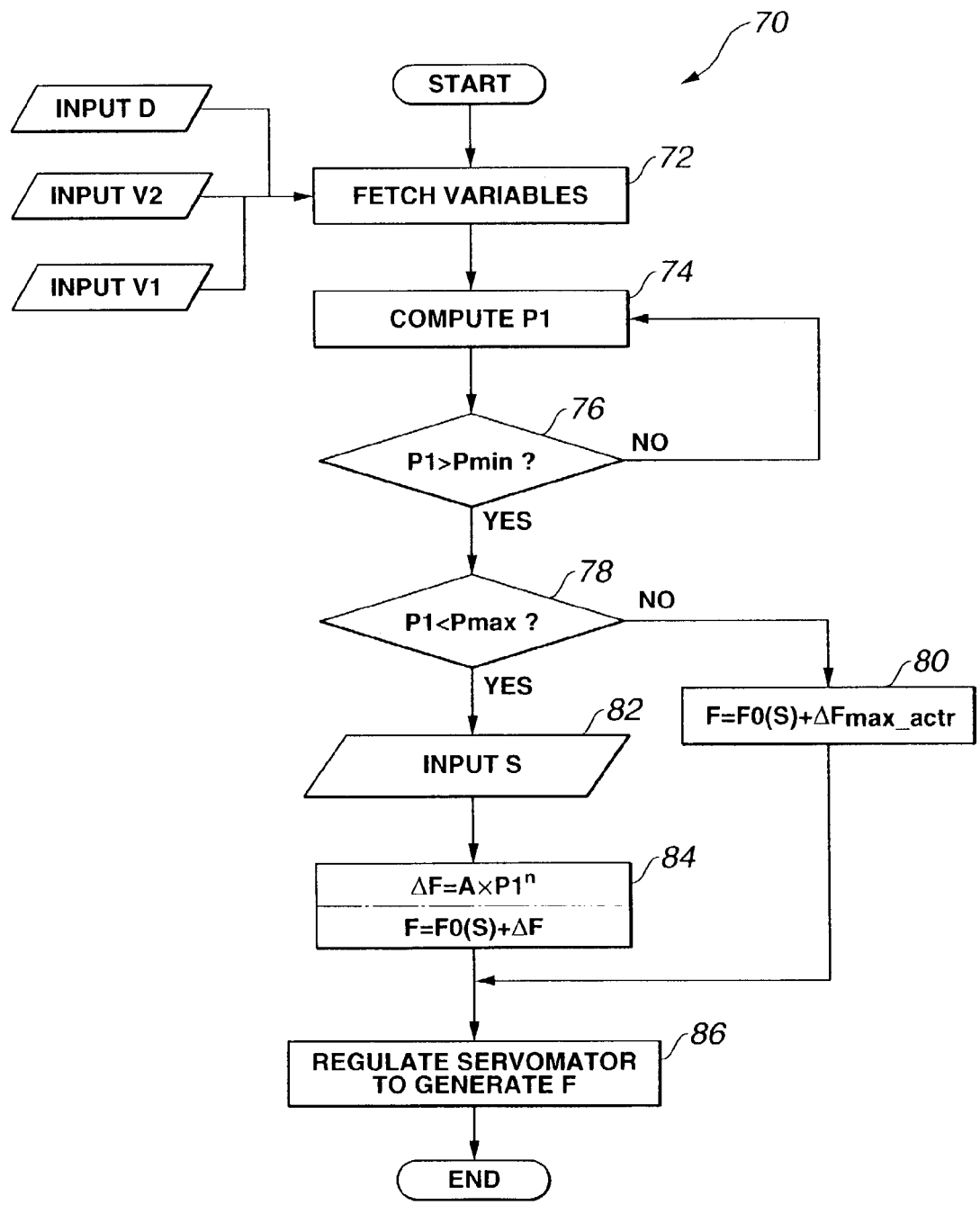
FIG. 10 is a flow diagram of a control routine for the implementation illustrated in FIG. 1.

An example of how a microprocessor-based controller would implement the above-mentioned implementation of the present invention can be understood with reference to FIG. 10. The flow diagram in FIG. 10 illustrates a control routine 70 of the implementation of the present invention. Execution of the control routine 70 is repeated at regular intervals, for example, 100 milliseconds.

In box 72, the controller fetches variables including intervehicle spacing (or distance) D, vehicle speed V2 of the preceding vehicle, and vehicle speed V1 of the following vehicle 12. In box 74, the controller computes the degree of risk P1 using the equations 1, 2 and 3.

In the next box 76, the controller determines whether or not the degree of risk P1 exceeds or greater than the cutoff value Pmin. If this is not the case, for example, the degree of risk P1 does not grow beyond Pmin, the routine returns to box 74 and waits for any change in the computed degree of risk P1. If the degree of risk P1 grows and exceeds the cutoff value Pmin, the routine goes from box 76 to box 78.

In box 78, the controller determines whether or not the degree of risk P1 is less than the critical value Pmax. If this is not the case, that is, the degree of risk P1 has grown to the critical value Pmax, the routine goes to box 80. In box 80, the controller inputs the information on accelerator pedal position S for determining the reaction force base F0(S) from the relationship illustrated in FIG. 5, and determines the reaction force at accelerator pedal F by adding the upper limit increment $\Delta$Fmax_actr to the reaction force base F0(S). The routine goes from box 80 to box 86.

If, in box 78, the controller determines that the degree of risk P1 is less than the critical value Pmax, the routine goes to box 82. In box 82, the controller inputs information on accelerator pedal position S. In the next box 84, the controller computes the reaction force increment $\Delta$F that is expressed as $\Delta F = A \cdot P1^n$. In the same box 84, the controller determines the reaction force at accelerator pedal F by adding the increment $\Delta$F to the reaction force base F0(S).

After box 84 or 80, the routine goes to box 86. In box 86, the controller determines a servomotor command in response to the determined reaction force F and applies the command to the servomotor 32 to regulate it to generate reaction force F at the accelerator pedal.

The exemplary implementation of the present invention computes the degree of risk P1 based on time to collision TTC and time headway THW. The degree of risk P1 indicates the degree of risk predicted to appear in future. The implementation of the present invention employs the exponential like equation (equation 4) to convert the computed degree of risk P1 into an increment $\Delta$F of reaction force at the accelerator pedal in such a manner that the varying of accelerator pedal reaction force F causes the vehicle operator to recognize the degree of risk as one recognize the same degree of risk out of visual information. This assists the vehicle operator effectively in recognizing the degree of risk without any failure. The implementation of the present invention permits the vehicle operator to perceive continuously through the accelerator pedal reaction force the degree of risk in addition to what one recognizes out of visual information, providing enhanced assist in driving the vehicle to deal with changing traffic circumstances.

The implementation of the present invention provides no increment $\Delta$F in reaction force to leave the vehicle operator unnoticed when the degree of risk P1 is below the cutoff value Pmin, thus preventing such degree of risk P1 from creating objectionable feel within the vehicle operator.

The implementation of the present invention permits a jump in reaction force by an amount as much as $\Delta$Fmax_actr ? $\Delta$Fmax when or immediately after the degree of risk P1 grows to the critical value Pmax, thus prompting the vehicle operator to initiate deceleration action by releasing the accelerator pedal.

The implementation of the present invention keeps the vehicle operator informed of varying in exponential like function over a range between the minimum and maximum reaction force increments Pmin and Pmax. This is advantageous over the before mentioned prior art because the vehicle operator is kept informed of varying of the degree of risk prior to the moment when the critical value Pmax is exceeded.

The implementation of the present invention has the following advantageous features.

The implementation of the present invention keeps the vehicle operator always informed of, through the sense of touch, the degree of risk P1 by continuously increasing the accelerator pedal reaction force. According to the implementation of the present invention, an increment ΔF of reaction force simply increases as a function of the degree of risk P1 between the minimum and maximum reaction force increments ΔFmin and ΔFmax. As mentioned before, there is a range of reaction force increment, which many vehicle operators can feel or perceive through the sense of touch although they are not prompted to release the accelerator pedal. The minimum reaction force increment ΔFmin is one or first magnitude in an area of the range lower limit, which area is immediate to a low threshold below which the magnitude of increment in reaction force cannot be felt or perceived through the sense of touch. The maximum reaction force increment ΔFmin is another or second magnitude in an area of the range upper limit.

The implementation of the present invention keeps the vehicle operator effectively informed of, through the sense of touch, varying of the degree of risk because it determines an intermediate value between the minimum and maximum reaction force increments ΔFmin and ΔFmax as an exponential like function of the degree of risk P1.

The implementation of the present invention keeps the vehicle operator directly informed of, through the sense of touch, the degree of risk without relying on the normal senses to see and to hear because it determines the reaction force base F0(S) as a function of the accelerator pedal position S and it increases the increment ΔF as the degree of risk grows.

The implementation of the present invention provides a considerable reduction in reaction time of the vehicle operator to the degree of risk exceeding critical value Pmax because it continues to provide information on the degree of risk prior to the moment when the degree of risk reaches the critical value Pmax and gives a warning by permitting a jump in reaction force at or immediately after this moment.

Figure 11:
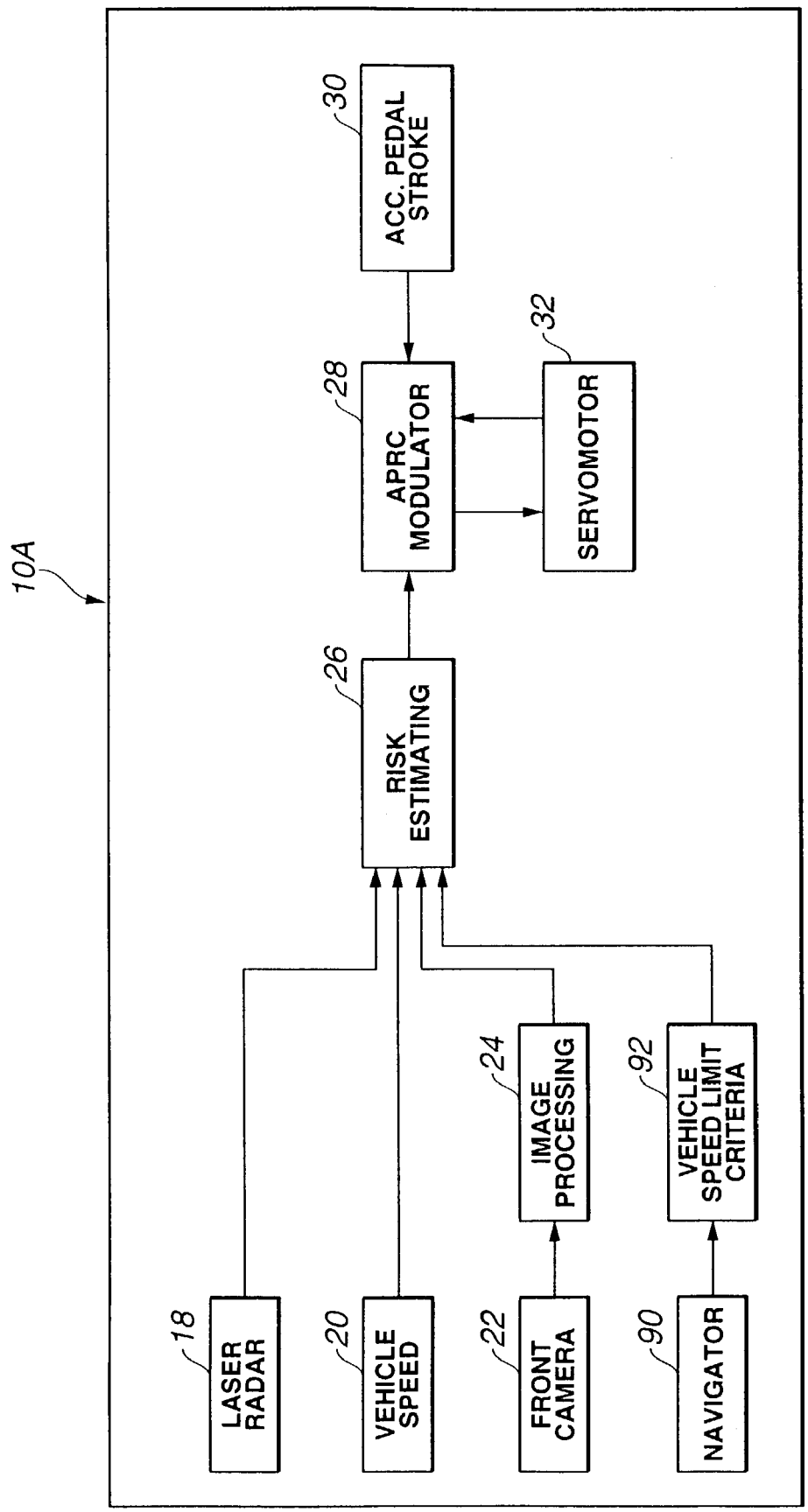
FIG. 11 is a control diagram showing control of another exemplary implementation of a driving assist system according to the present invention.

FIG. 11 illustrates a portion of another implementation of the present invention. This implementation is substantially the same as the first mentioned implementation illustrated in FIG. 1. A driving assist system, indicated generally at 10A, illustrated in FIG. 11 is substantially the same as the driving assist system 10 illustrated in FIG. 1, but it further includes a navigator 90 and a database of vehicle speed limit criteria 92. The database may be a part of the navigator 90. As the discussion proceeds, it will be understood that the implementation of the present invention illustrated in FIG. 11 uses the navigator 90 and the database of vehicle speed limit criteria 92 to receive information on a vehicle speed limit assigned to a road on which the motor vehicle 12 (see FIG. 2) is driving. The implementation may receive the same information, without relying on the navigator 90 and the database of vehicle speed limit criteria 92, through communication between vehicle and road.

With continuing reference to FIG. 11, the driving assist system 10A according to the implementation of the present invention determines the degree of risk P2 in the case where there is no preceding vehicle to follow or it is difficult to detect the preceding vehicle.

In FIG. 11, the navigator 90 has a GPS receiver or a beacon receiver and connected to the database of vehicle speed limit criteria 92. The implementation of the present invention receives information on a road on which the motor vehicle 12 is driving from the navigator 90 and then it receives information on a vehicle speed limit $V_{taeget}$ assigned to this road from the vehicle speed limit criteria 92. The vehicle speed limit $V_{target}$ is used as input of a risk-estimating unit 26.

The risk-estimating unit 26 determines the degree of risk P2 based on inputs from laser radar 18, vehicle speed sensor 20 and front camera 22. The degree of risk P2 is expressed as.

$$P2 = c/(V_{target} - V1) \quad \text{Eq. 6}$$

where: c is the parameter for adjustment of the degree of risk P2 with regard to the degree of risk P1.

The determined degree of risk P2 is used as input to an APRC modulator 28. The APRC modulator 28 determines a reaction force base F0(S) in response to an accelerator pedal position S from the reaction force map in FIG. 5. Using the characteristic illustrated in FIG. 4, it determines the reaction force increment ΔF in response to the degree of risk P2. From the reaction force base F0(S) and increment ΔF, it determines the reaction force at accelerator pedal F which is expressed by the equation 5.

The APRC modulator 28 determines a servomotor command in response to the determined reaction force at acceleration pedal F. It applies the servomotor command to servomotor 32, causing it to produce force as much as the determined reaction force F. The vehicle operator can perceive by the sense of touch the degree of risk P2 through the increment ΔF that has been added to the reaction force base FS(0).

As different from the previously described implementation, the implementation illustrated in FIG. 11 uses the illustrated characteristic in FIG. 4. In using this characteristic in FIG. 4, the horizontal axis is calibrated so that the critical value Pmax is accomplished by the degree of risk P2 when the vehicle speed V1 is equal to the vehicle speed limit $V_{target}$. The implementation permits application of reaction force as mush as an upper limit value ΔFmax_actr+F0(S) to the accelerator pedal 14 (see FIG. 3) when the vehicle speed V1 reaches the vehicle speed limit $V_{target}$, forcibly prompting the vehicle operator to release the accelerator pedal 14.

Figure 12:
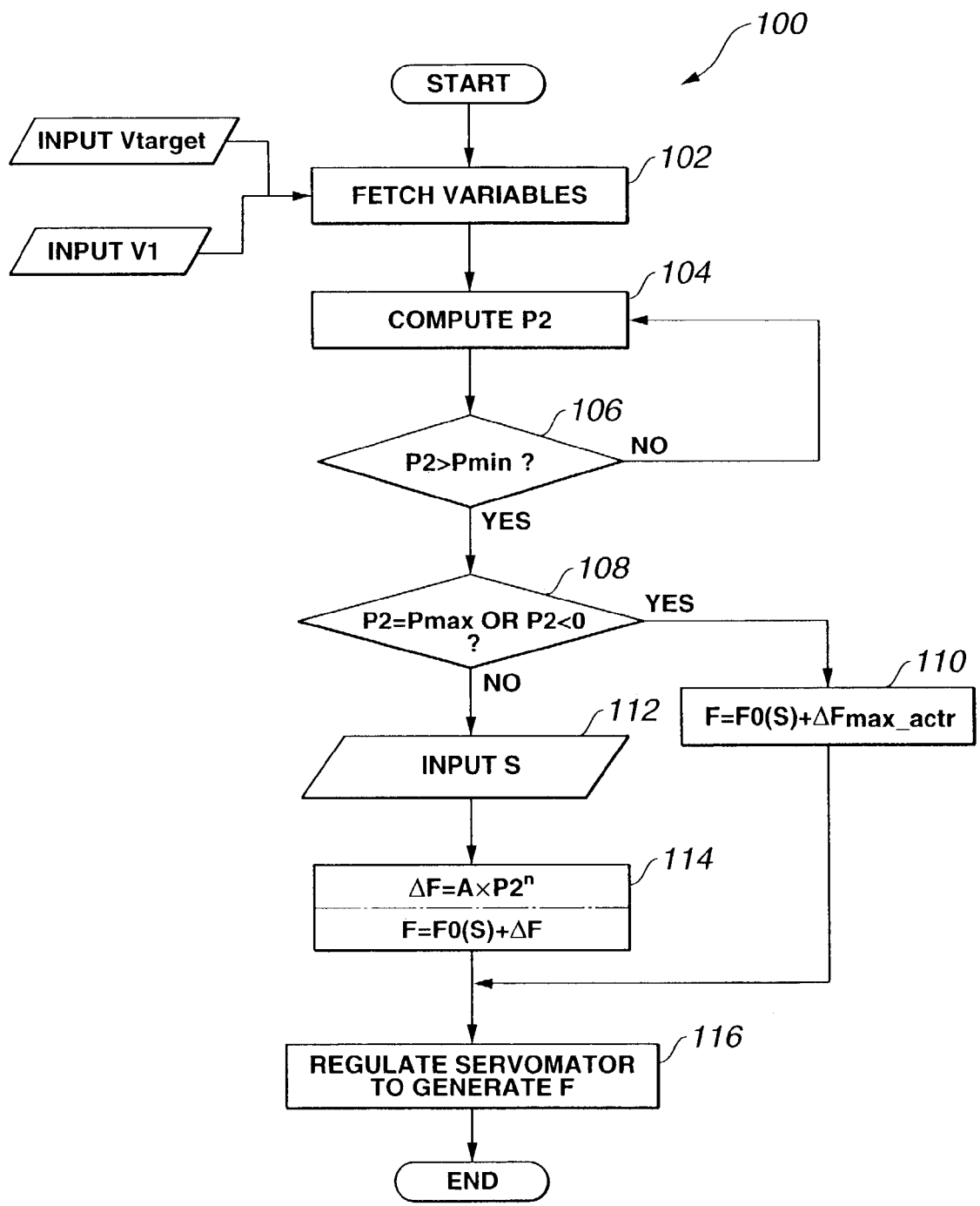
FIG. 12 is a flow diagram of a control routine for the implementation in FIG. 11.

An example of how a microprocessor-based controller would implement the above-mentioned implementation illustrated in FIG. 11 can be understood with reference to FIG. 12. The flow diagram in FIG. 12 illustrates a control routine 100 of the implementation of the present invention illustrated in FIG. 11. Execution of the control routine 100 is repeated at regular intervals, for example, 100 milliseconds.

In box 102, the controller fetches variables including vehicle speed limit $V_{target}$ and vehicle speed V1 of the vehicle 12. In box 104, the controller computes the degree of risk P2 using the equation 6.

In the next box 106, the controller determines whether or not the degree of risk P2 exceeds or greater than the cutoff value Pmin. If this is not the case, for example, the degree of risk P2 does not grow beyond Pmin, the routine returns to box 104 and waits for any change in the computed degree of risk P2. If the degree of risk P2 grows and exceeds the cutoff value Pmin, the routine goes from box 106 to box 108.

In box 108, the controller determines whether or not the degree of risk P2 is equal to the critical value Pmax or it is less than zero. If this is the case, the routine goes to box 110. In box 110, the controller inputs the information on accelerator pedal position S for determining the reaction force base F0(S) from the relationship illustrated in FIG. 5, and determines the reaction force at accelerator pedal F by adding the upper limit increment ΔFmax_actr to the reaction force base F0(S). The routine goes from box 110 to box 116.

If, in box 108, the controller determines that the degree of risk P2 is less than the critical value Pmax but not less than zero, the routine goes to box 112. In box 112, the controller inputs information on accelerator pedal position S. In the next box 114, the controller computes the reaction force increment ΔF that is expressed as $\Delta F = A \cdot P2^n$. In the same box 114, the controller determines the reaction force at accelerator pedal F by adding the increment ΔF to the reaction force base F0(S).

After box 114 or 110, the routine goes to box 116. In box 116, the controller determines a servomotor command in response to the determined reaction force F and applies the command to the servomotor 32 to regulate it to generate reaction force F at the accelerator pedal.

FIGS. 13 to 16 illustrate another exemplary implementation of the present invention. This implementation is substantially the same as the implementation illustrated in FIG. 11.

Figure 13:
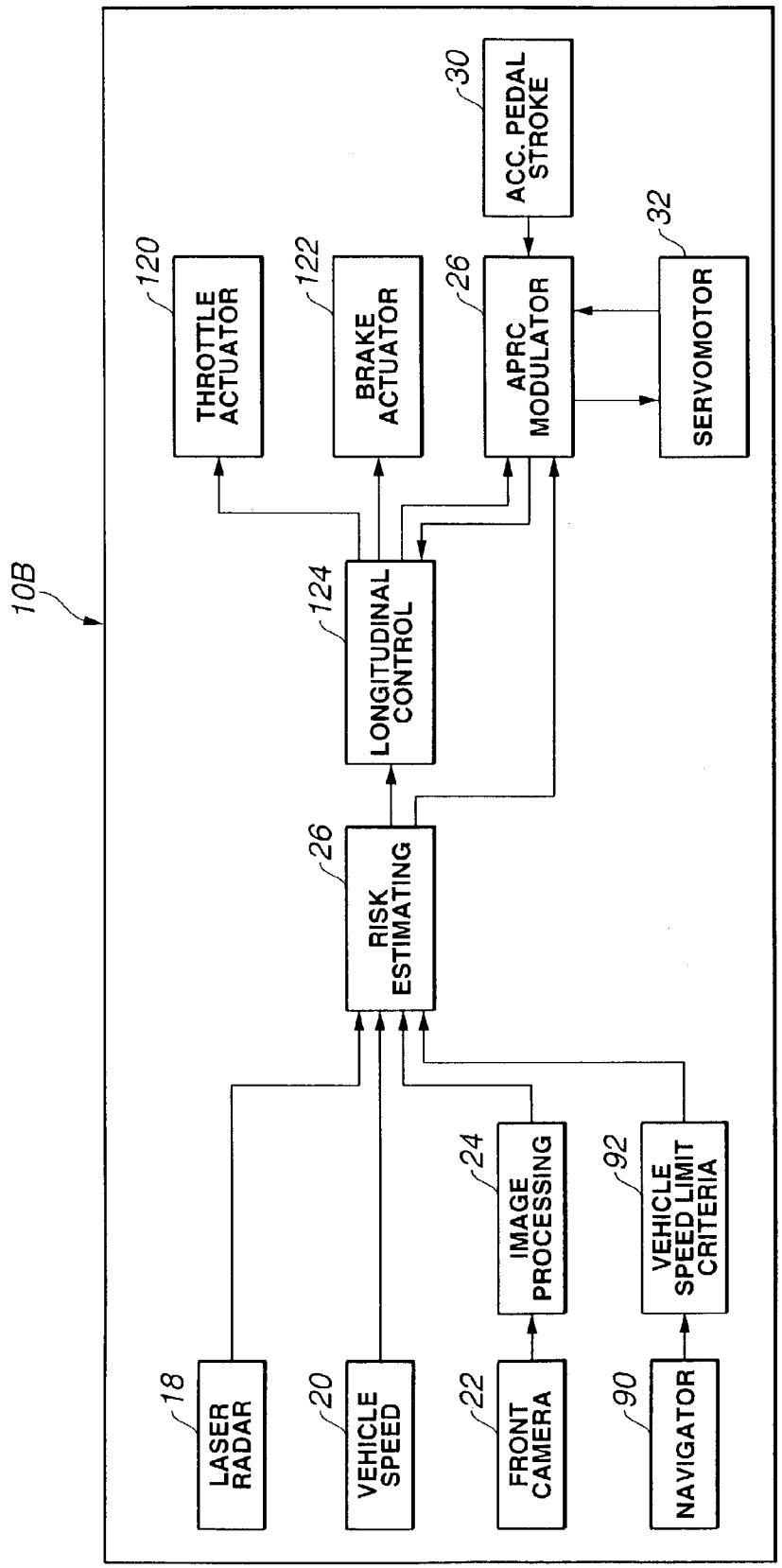
FIG. 13 is a control diagram showing control of another exemplary implementation of a driving assist system according to the present invention.
Figure 14:
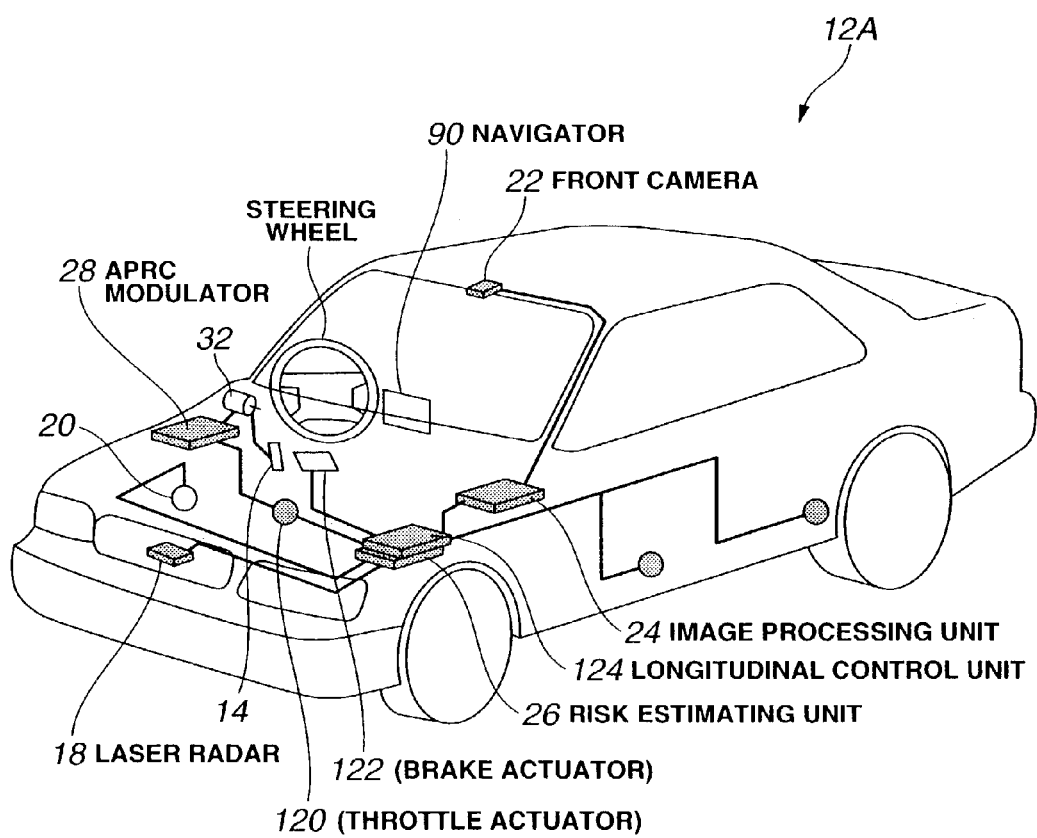
FIG. 14 is a view illustrating how hardware of the implementation illustrated in FIG. 13 is arranged on a motor vehicle.

In FIG. 13, the reference numeral 10B generally indicates a driving assist system for a motor vehicle 12A illustrated in FIG. 14. In hardware, the driving assist system 10B is substantially the same as that illustrated in FIG. 11 except the provision of a throttle actuator 120, a brake actuator 122 and a longitudinal control unit 124. The longitudinal control unit 124 is operatively connected with a throttle actuator 120 and a brake actuator 122 in a known manner to carry out an intervehicle spacing control if need arises or demanded. This implementation of the present invention permits the longitudinal control unit 124 to carry out the intervehicle spacing control when the vehicle operator depresses an accelerator pedal 14 (see FIG. 3) deeply further beyond a critical accelerator pedal position S(V2) as long as the degree of risk P1 falls in a range between a cutoff value Pmin and a critical value Pmax upon detecting the preceding vehicle. The implementation of the present invention sets, as the critical accelerator pedal position S(V2), an accelerator pedal position when the vehicle speed V1 of the motor vehicle 12A (see FIG. 14) has matched the vehicle speed V2 of the preceding vehicle. In the same manner as the preceding implementation illustrated in FIG. 11, the implementation illustrated in FIG. 13 permits reaction force control based on the degree of risk P2 upon detecting no preceding vehicle.

With reference to FIG. 13, a risk-estimating unit 26 computes the degree of risk P1 that is expressed as the equation 3 upon detecting the preceding vehicle. When there is no preceding vehicle or upon failing to detect the preceding vehicle running ahead on a curved road ahead, the risk estimating unit 26 computes the degree of risk P2 that is expressed as the equation 6. In the same manner as carried out in the driving assist systems 10 and 10A illustrated in FIGS. 1 and 11, the driving assist system 10B carries out the accelerator pedal reaction force control in response to the degree of risk P1 or P2.

Figure 15A:
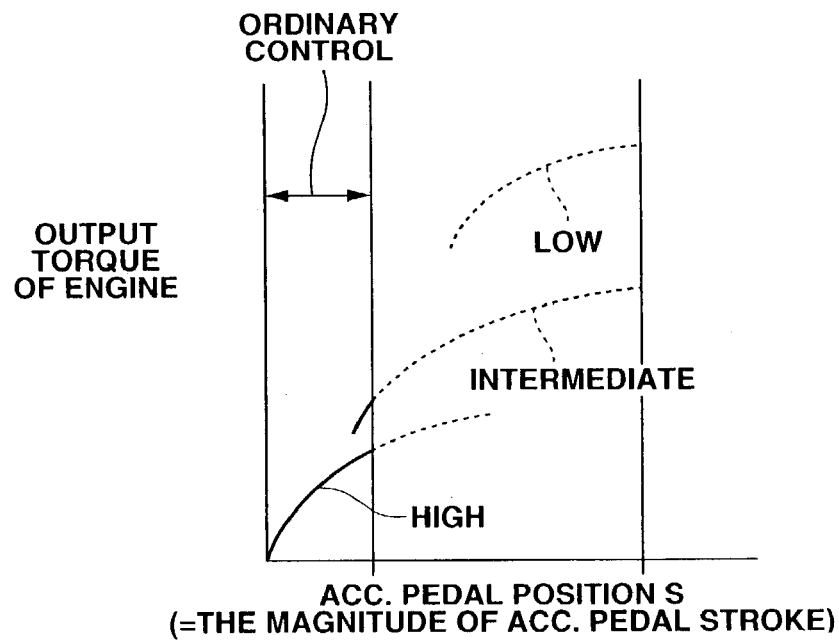
FIGS. 15A and 15B are views illustrating one mode how the implementation illustrated in FIG. 13 operates.
Figure 15B:
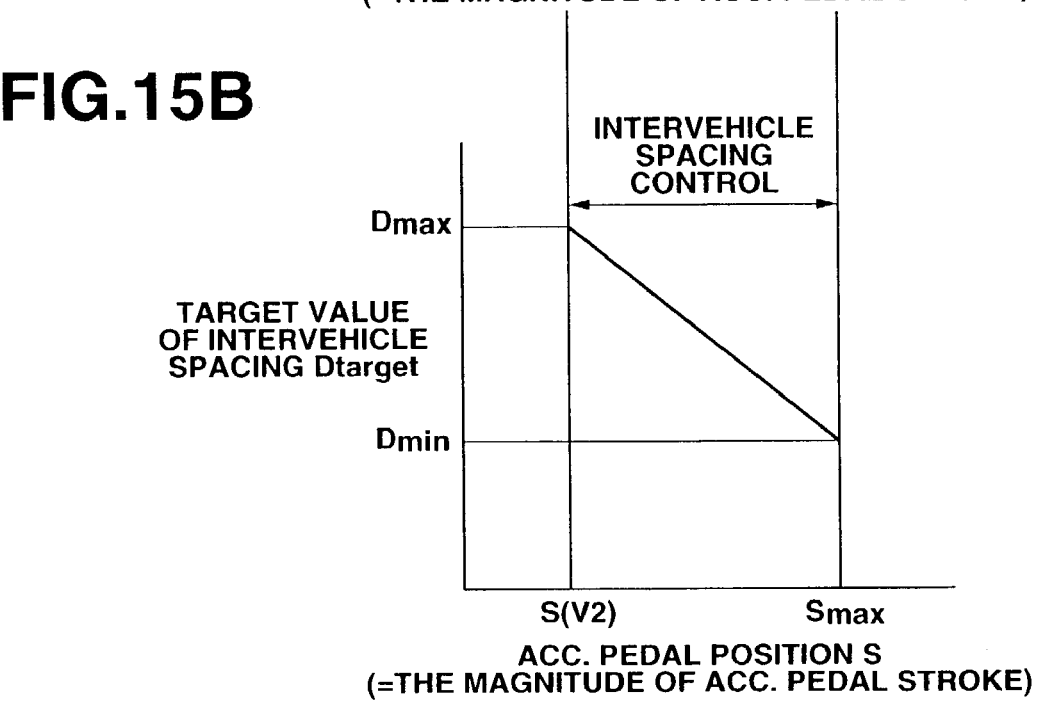

With reference now to FIGS. 15A and 15B, the implementation of the present invention divides the whole operation range into two sub-ranges in response to the accelerator pedal position S. The sub-ranges include an ordinary control sub-range wherein engine torque is regulated in a predetermined schedule with the accelerator pedal position S. The sub-ranges further include an intervehicle spacing control sub-range wherein engine torque is regulated for intervehicle spacing control in cooperation with regulation of brake torque to maintain a target value of intervehicle spacing $D_{target}$. According to the implementation, the ordinary control is selected when the accelerator pedal position S is less than or equal to the critical accelerator pedal position S(V2), and the intervehicle spacing control is selected when the accelerator pedal position S exceeds the critical accelerator pedal position S(V2). FIG. 15B illustrates how the implementation of the present invention determines the target value of intervehicle spacing $D_{target}$ as a function of the accelerator pedal position S. The implementation of the present invention sets an intervehicle spacing established when the vehicle speeds V1 and V2 match each other as a max-intervehicle spacing Dmax. The implementation of the present invention can vary the target value of intervehicle spacing $D_{target}$ from the max-intervehicle spacing Dmax to a predetermined min-intervehicle spacing Dmin and vice versa (Dmax>Dmin). As illustrated by the line in FIG. 15B, the implementation of the present invention continuously and linearly decreases the target value of intervehicle spacing $D_{target}$ as the accelerator pedal 14 is depressed beyond the critical accelerator pedal position S(V2) toward the fully depressed position Smax.

As is well known in the art, the longitudinal control unit 124 can maintain the target-value of intervehicle spacing $D_{target}$ when it is set by controlling the throttle actuator 120 and brake actuator 122 in response to processing result of a control logic based on information on current value of intervehicle spacing provided by the laser radar 18. The implementation of the present invention, however, prohibits such intervehicle spacing control when the risk estimating unit 26 determines that the degree of risk P1 has grown to or exceeded the critical value Pmax.

The implementation of the present invention provides the accelerator pedal reaction force control in response to the degree of risk P1 while the vehicle operator is operating the accelerator pedal 14 to carry out the intervehicle spacing control over a range beyond the critical accelerator pedal S(V2). The implementation of the present invention permits the intervehicle spacing control as long as the degree of risk P1 falls between Pmin and Pmax.

Figure 16:
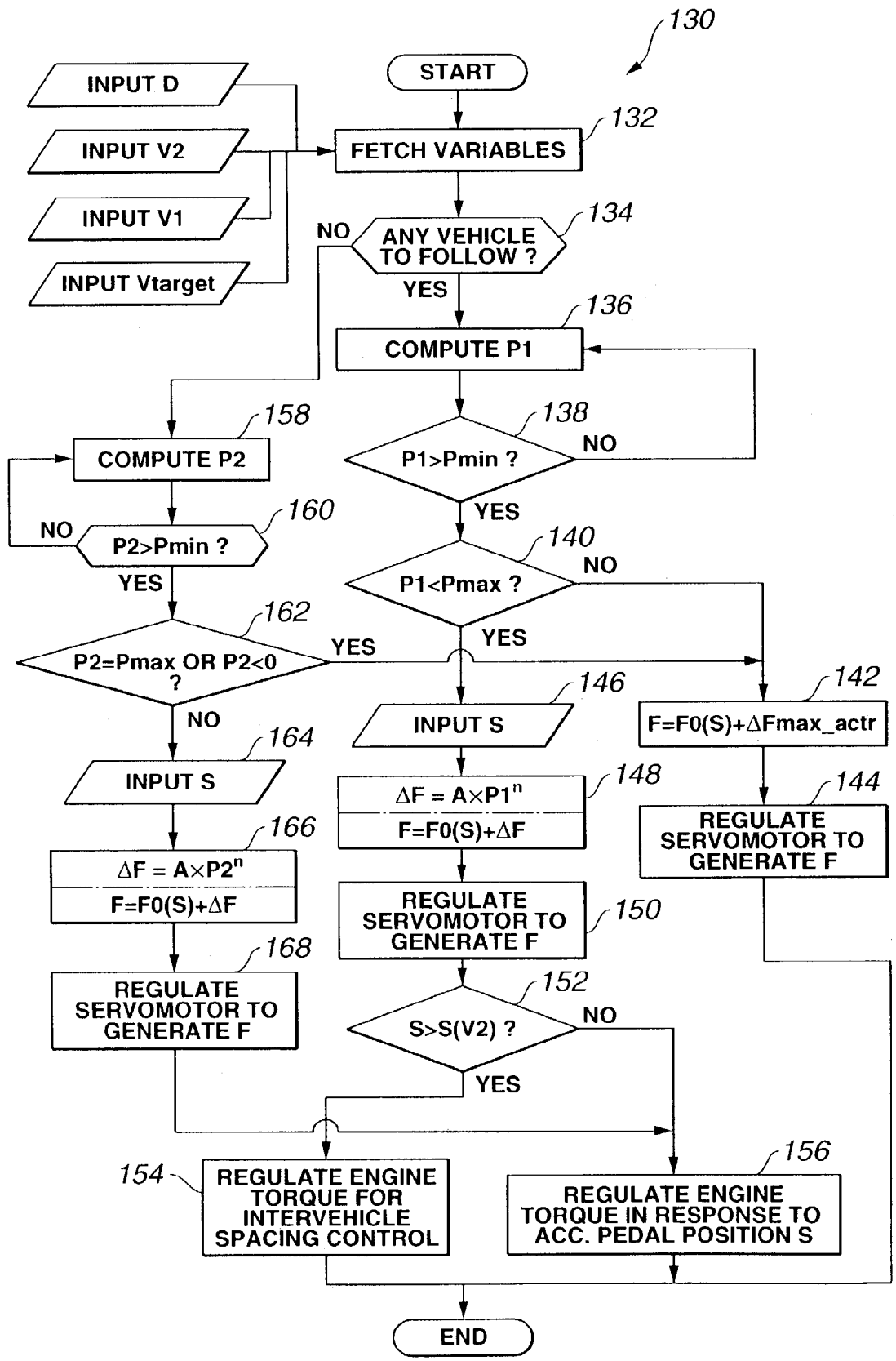
FIG. 16 is a flow diagram of a control routine for the implementation illustrated in FIG. 13.

An example of how a microprocessor-based controller would implement the above-mentioned implementation illustrated in FIG. 13 can be understood with reference to FIG. 16. The flow diagram in FIG. 16 illustrates a control routine 130 of the implementation of the present invention illustrated in FIG. 13. Execution of the control routine 130 is repeated at regular intervals, for example, 100 milliseconds.

The control routine 130 incorporates the control routine 70 (see FIG. 10) and the control routine 100 (see FIG. 12). As the discussion proceeds, it will be understood that boxes 136 to 150 correspond substantially to boxes 74 to 86 of the control routine 70. It will also be understood that boxes 158 to 168 and boxes 142, 144 correspond substantially to boxes 104 to 116 of the control routine 100. It will be further noted that box 132 is common to boxes 72 and 102.

In FIG. 16, at box 132, the controller fetches variables including intervehicle spacing (or distance) D, vehicle speed V2 of the preceding vehicle, vehicle speed V1 of the vehicle 12A, and vehicle speed limit $V_{target}$. In the next box 134, the controller determines whether or not there is any preceding vehicle to follow. If this is the case, the routine goes to box 136. If this is not the case, the routine goes to box 158.

In box 136, the controller computes the degree of risk P1 using the equations 1, 2 and 3.

In the next box 138, the controller determines whether or not the degree of risk P1 exceeds or greater than the cutoff value Pmin. If this is not the case, for example, the degree of risk P1 does not grow beyond Pmin, the routine returns to box 136 and waits for any change in the computed degree of risk P1. If the degree of risk P1 grows and exceeds the cutoff value Pmin, the routine goes from box 138 to box 140.

In box 140, the controller determines whether or not the degree of risk P1 is less than the critical value Pmax. If this is not the case, that is, the degree of risk P1 has grown to the critical value Pmax, the routine goes to box 142. In box 142, the controller inputs the information on accelerator pedal position S for determining the reaction force base F0(S) from the relationship illustrated in FIG. 5, and determines the reaction force at accelerator pedal F by adding the upper limit increment ΔFmax_actr to the reaction force base F0(S). In the next box 144, the controller determines a servomotor command in response to the determined reaction force F and applies the command to the servomotor 32 to regulate it to generate reaction force F at the accelerator pedal before the routine comes to an end.

If, in box 140, the controller determines that the degree of risk P1 is less than the critical value Pmax, the routine goes to box 146. In box 146, the controller inputs information on accelerator pedal position S. In the next box 148, the controller computes the reaction force increment ΔF that is expressed as $\Delta F = A \cdot P1''$. In the same box 148, the controller determines the reaction force at accelerator pedal F by adding the increment ΔF to the reaction force base F0(S). In the next box 150, the controller determines servomotor command in response to the determined reaction force F and applies the command to the servomotor 32 to regulate it to generate reaction force F at the accelerator pedal.

After box 150, the routine goes to box 152. In box 152, the controller determines whether or not the accelerator pedal position S is greater than or exceeds the critical accelerator pedal S(V2). If this is the case, the routine goes to box 154. In box 154, the controller carries out intervehicle spacing control by regulating engine torque and brake torque in a manner as mentioned before in connection with FIG. 15B. If this is not the case, the routine goes to box 156. In box 156, the controller carries out ordinary control by regulating engine torque in response to the accelerator pedal position S. After boxe 154 or 156, the routine comes to an end.

Returning back to box 134, if there is no preceding vehicle to follow or detection of the preceding vehicle fails, the routine goes from box 134 to box 158.

In box 158, the controller computes the degree of risk P2 using the equation 6.

In the next box 160, the controller determines whether or not the degree of risk P2 exceeds or greater than the cutoff value Pmin. If this is not the case, for example, the degree of risk P2 does not grow beyond Pmin, the routine returns to box 158 and waits for any change in the computed degree of risk P2. If the degree of risk P2 grows and exceeds the cutoff value Pmin, the routine goes from box 160 to box 162.

In box 162, the controller determines whether or not the degree of risk P2 is equal to the critical value Pmax or it is less than zero. If this is the case, the routine goes to box 142.

If, in box 162, the controller determines that the degree of risk P2 is less than the critical value Pmax but not less than zero, the routine goes to box 164. In box 164, the controller inputs information on accelerator pedal position S. In the next box 166, the controller computes the reaction force increment ΔF that is expressed as $\Delta F = A \cdot P2$. In the same box 166, the controller determines the reaction force at accelerator pedal F by adding the increment ΔF to the reaction force base F0(S).

In the next box 168, the controller determines a servomotor command in response to the determined reaction force F and applies the command to the servomotor 32 to regulate it to generate reaction force F at the accelerator pedal. After box 168, the routine goes to box 156 before coming to an end.

Figure 17A:
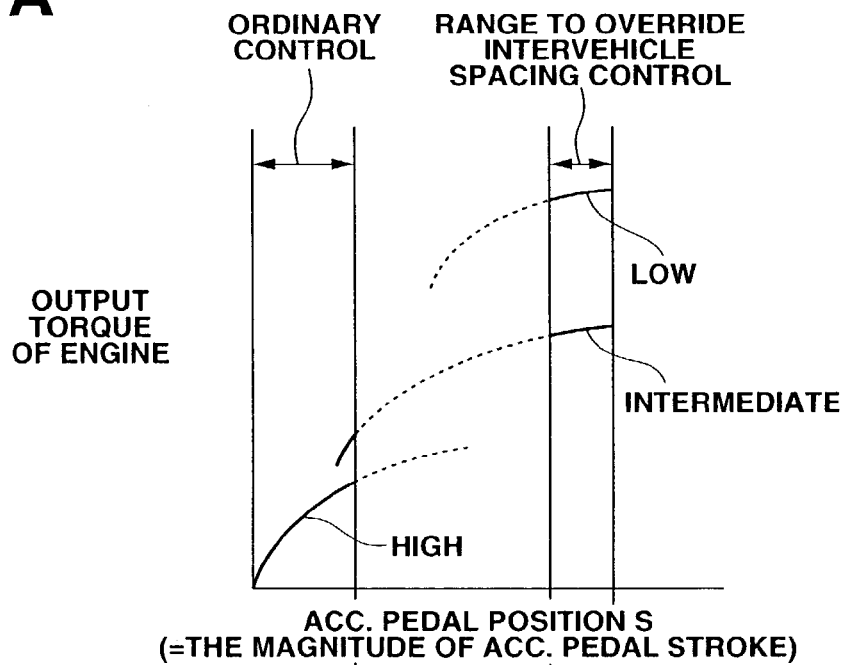
FIGS. 17A and 17B are similar views to FIGS. 15A and 15B, illustrating one mode how another exemplary implementation of a drive assist system according to the present invention operates.
Figure 17B:
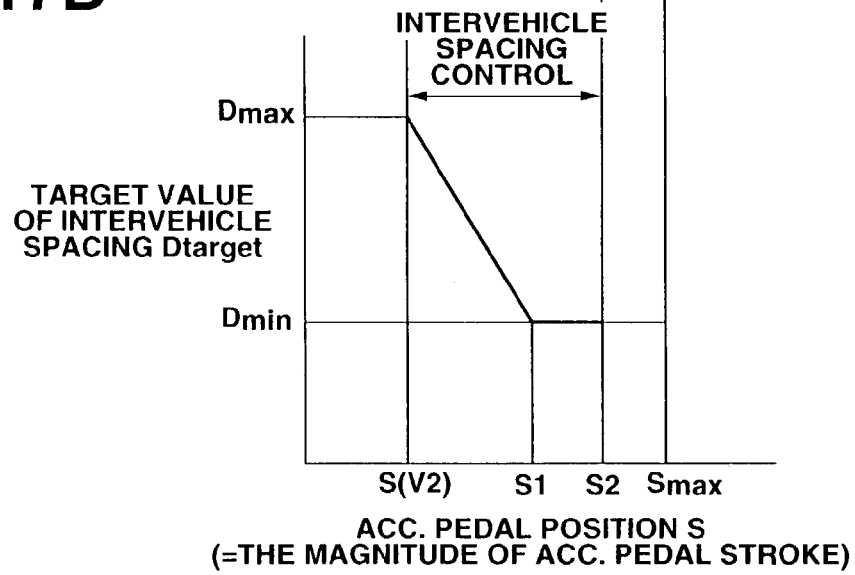
Figure 18:
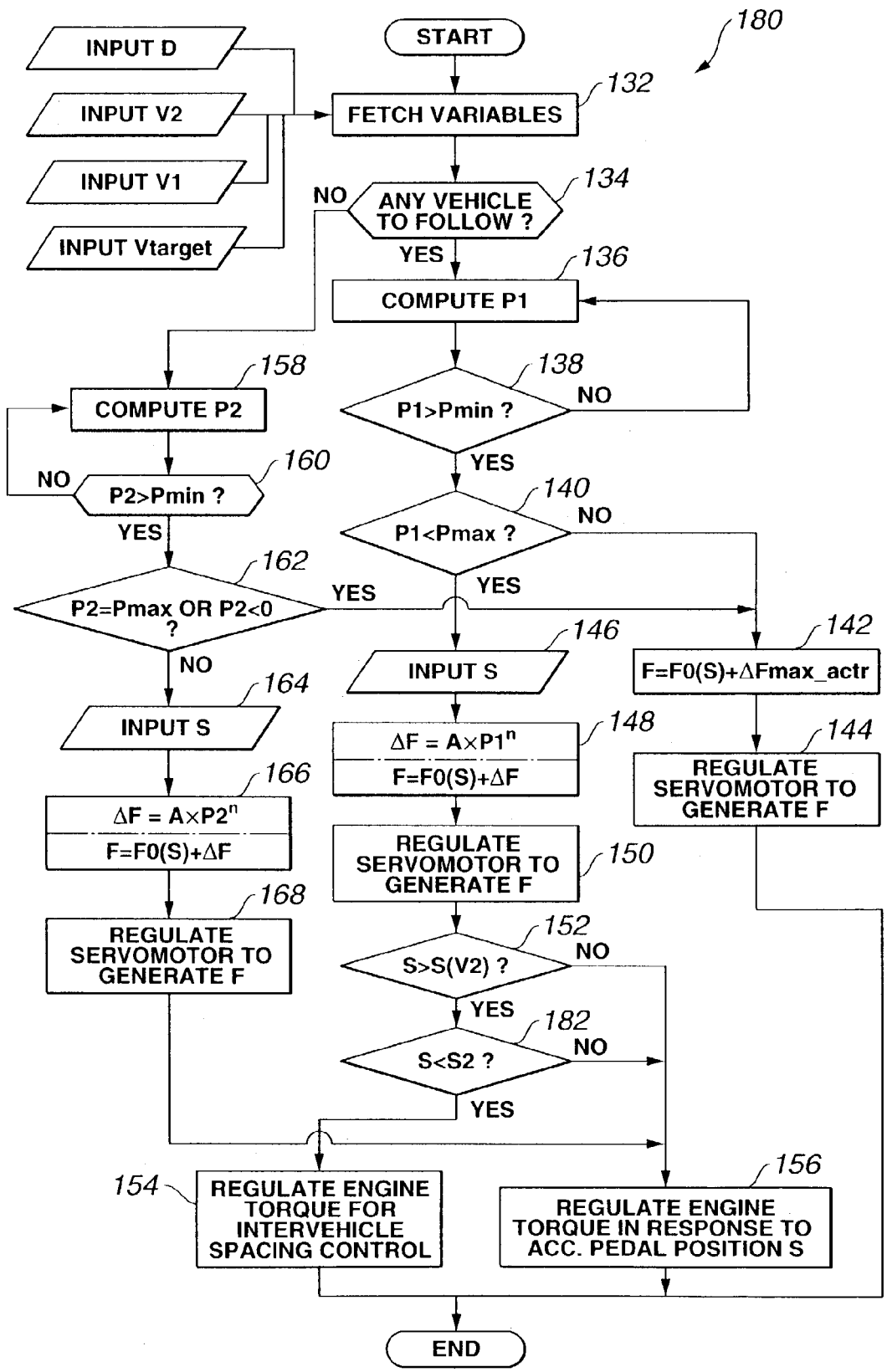
FIG. 18 is a flow diagram of a control routine for the implementation illustrated in FIGS. 17A and 17B.

FIGS. 17A, 17B and 18 illustrate a portion of another exemplary implementation of the present invention. This implementation is substantially the same as the implementation illustrated in FIGS. 13 to 16.

This implementation is substantially the same as the implementation illustrated in FIGS. 13 to 16. In the same manner as the previously described implementation in FIGS. 13 to 16, this implementation of the present invention permits a longitudinal control unit 124 to carry out the intervehicle spacing control when the vehicle operator depresses an accelerator pedal 14 (see FIG. 3) deeply further beyond a critical accelerator pedal position S(V2) as long as the degree of risk P1 falls in a range between a cutoff value Pmin and a critical value Pmax upon detecting the preceding vehicle. In the same manner, this implementation of the present invention sets, as the critical accelerator pedal position S(V2), an accelerator pedal position when the vehicle speed V1 of the motor vehicle 12A (see FIG. 14) has matched the vehicle speed V2 of the preceding vehicle.

With reference now to FIGS. 17A and 17B, the implementation of the present invention divides the whole operation range into three sub-ranges in response to the accelerator pedal position S. The sub-ranges include an ordinary control sub-range wherein engine torque is regulated in a predetermined schedule with the accelerator pedal position S. The sub-ranges further include an intervehicle spacing control sub-range wherein engine torque is regulated for intervehicle spacing control in cooperation with regulation of brake torque to maintain a target value of intervehicle spacing $D_{target}$. The sub-ranges still further include a sub-range to override intervehicle spacing control wherein engine torque is regulated in response to the accelerator pedal position S. According to the implementation, the ordinary control is selected when the accelerator pedal position S is less than or equal to the critical accelerator pedal position S(V2). The intervehicle spacing control is selected when the accelerator pedal position S exceeds the critical accelerator pedal position S(V2) but less than a second accelerator pedal reference position S2. The sub-range to override the intervehicle spacing control is selected when the accelerator pedal position S exceeds the second accelerator pedal reference position S2.

FIG. 17B illustrates how the implementation of the present invention determines the target value of intervehicle spacing $D_{target}$ as a function of the accelerator pedal position S. The implementation of the present invention sets an intervehicle spacing established when the vehicle speeds V1 and V2 match each other as a max-intervehicle spacing Dmax. The implementation of the present invention can vary the target value of intervehicle spacing $D_{target}$ from the max-intervehicle spacing Dmax to a predetermined min-intervehicle spacing Dmin and vice versa (Dmax>Dmin). As illustrated by the line in FIG. 15B, the implementation of the present invention continuously and linearly decreases the target value of intervehicle spacing $D_{target}$ as the accelerator pedal 14 is depressed beyond the critical accelerator pedal position S(V2) toward a first accelerator pedal reference position S1 (S1<S2). The implementation sets the predetermined min-intervehicle spacing Dmin as the target value of intervehicle spacing $D_{target}$ when the accelerator pedal 14 is depressed to the first predetermined accelerator pedal reference position S1. The implementation keeps on setting the predetermined min-intervehicle spacing Dmin as the target value of intervehicle spacing $D_{target}$ when the accelerator pedal 14 is depressed beyond the first predetermined accelerator pedal reference position S1 to the second predetermined accelerator pedal reference position S2. When the accelerator pedal 14 is depressed beyond the second predetermined accelerator pedal S2 to the fully depressed position Smax, the implementation selects the sub-range to override the intervehicle spacing control to carry out the ordinary control.

In the same manner as the previously described implementation illustrated in FIGS. 13 to 16, the implementation according to the present invention provides the accelerator pedal reaction control in response to the degree of risk P1 during intervehicle spacing control.

In FIG. 17B, the function that determines the target value of intervehicle spacing $D_{target}$ used for intervehicle spacing control is different from the function illustrated in FIG. 15B in the provision of a transient control zone over the accelerator pedal position range S1–S2. As mentioned above, the predetermined min-intervehicle spacing Dmin is set as the target value of intervehicle spacing $D_{target}$. The implementation of the present invention provides this transient control zone to make a smooth shift from the intervehicle spacing control to the ordinary control in the sub-range to override intervehicle spacing control.

An example of how a microprocessor-based controller would implement the above-mentioned implementation illustrated in FIGS. 17A and 17B can be understood with reference to FIG. 18. The flow diagram in FIG. 18 illustrates a control routine 180 of the implementation of the present invention illustrated in FIGS. 17A and 17B. Execution of the control routine 180 is repeated at regular intervals, for example, 100 milliseconds.

The control routine 180 is substantially the same as the control routine 130 illustrated in FIG. 16 except the provision of box 182. Further, the content of the intervehicle spacing control in box 154 is slightly different from the content in box 154 illustrated in FIG. 16.

In FIG. 18, if the interrogation in box 152 results in affirmative, the routine goes to box 182. In box 182, the controller determines whether or not the accelerator pedal position S is less than the second accelerator pedal reference position S2 (see FIG. 17B). If this is the case, the routine goes to box 154. In box 154, the controller carries out the intervehicle spacing control as described in connection with FIG. 17B. If, in box 182, the accelerator pedal position S is equal to or greater than the second accelerator pedal reference position S2, the routine goes to box 156 to carry out sub-routine to override the intervehicle spacing control. In box 156, the controller carries out the ordinary control by regulating the engine torque in response to the accelerator pedal position S.

The implementation of the present invention overrides the intervehicle spacing control when the accelerator pedal 14 is depressed further deeply beyond the second accelerator pedal reference position S2, making it easy for the vehicle operator to pass the preceding vehicle. The vehicle operator can perceive by the sense of touch the degree of risk P1 during manipulation of the accelerator pedal to pass the preceding vehicle.

Figure 19A:
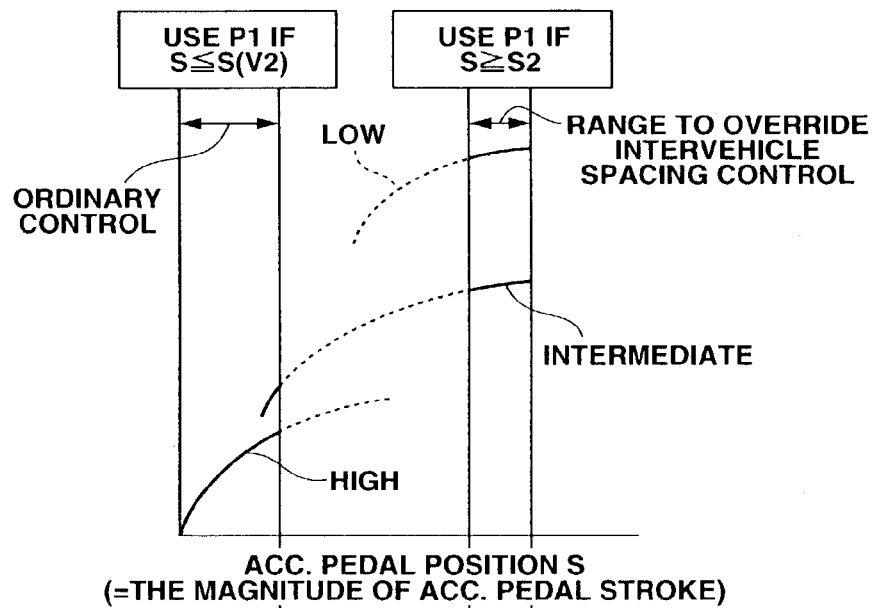
FIGS. 19A and 19B are similar views to FIGS. 15A and 15B, illustrating one mode how another exemplary implementation of a drive assist system according to the present invention operates.
Figure 19B:
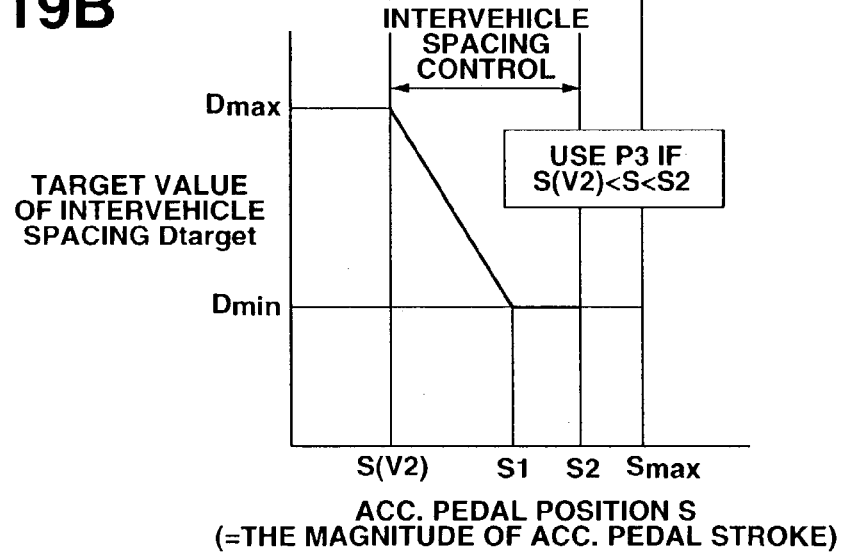
Figure 20:
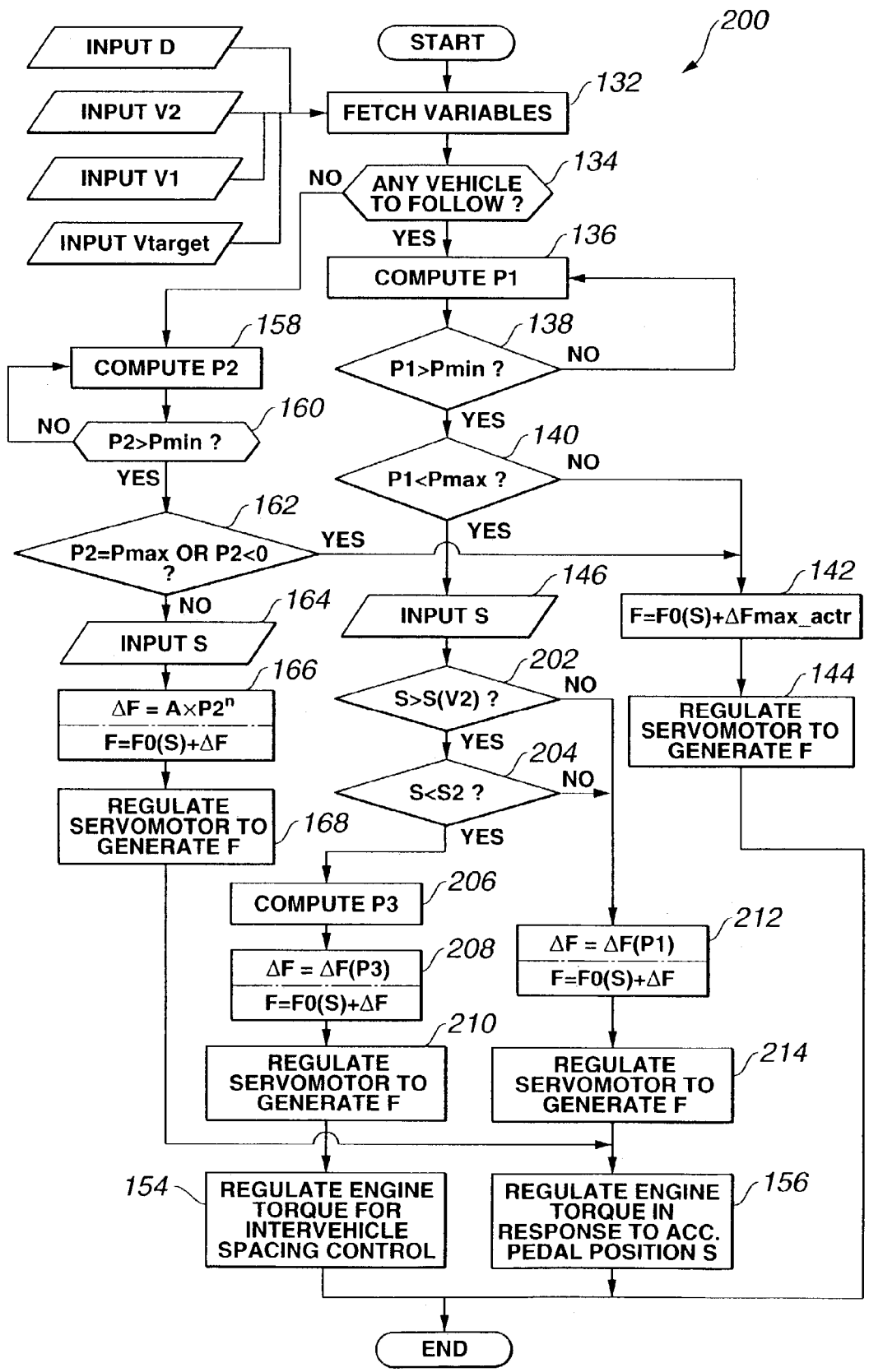
FIG. 20 is a flow diagram of a control routine for the implementation illustrated in FIGS. 19A and 19B.

FIGS. 19A, 19B and 20 illustrate a portion of another exemplary implementation of the present invention. This implementation is substantially the same as the implementation illustrated in FIGS. 17A, 17B and 18.

The previous implementation illustrated in FIGS. 17A and 17B applies the accelerator pedal reaction force in response to the degree of risk P1 over the intervehicle spacing control. As different from this, the implementation of the present invention illustrated in FIGS. 19A and 19B applies the accelerator pedal reaction force in response to the degree of risk P3. The degree of risk P3 is different from the degree of risk P1. The degree of risk P3 is expressed as, $$P3 = \frac{a \cdot V1}{D} = \frac{a}{THW} \qquad \text{Eq. 7}$$

Comparing the equation 7 with the equation 3 indicates that the degree of risk P3 results after deleting the second term (b/TTC) from the degree of risk P1. The parameter a used in the equation 7 is the same as that used in the equation 3.

The implementation of the present invention allows the vehicle operator to feel reaction force determined in response to the degree of risk P3 during intervehicle spacing control. Because the degree of risk P3 is less than the degree of risk P1, the implementation of the present invention allows the vehicle operator to drive comfortably during intervehicle spacing control by suppressing transmission of risk to the vehicle operator.

An example of how a microprocessor-based controller would implement the above-mentioned implementation illustrated in FIGS. 19A and 19B can be understood with reference to FIG. 20. The flow diagram in FIG. 20 illustrates a control routine 200 of the implementation of the present invention illustrated in FIGS. 19A and 19B. Execution of the control routine 200 is repeated at regular intervals, for example, 100 milliseconds.

The control routine 200 is substantially the same as the control routine 180 illustrated in FIG. 18 except the provision of boxes 202 to 214 in the place of boxes 148, 150, 150, 152 and 182. However, a path of flow along boxes 146, 202, 212, 214 and 156 and another path of flow along boxes 202, 204, 212, 214 and 156 illustrated in FIG. 20 correspond to the path of flow along boxes 146, 148, 150, 152 and 156 and the path of flow along boxes 146, 148, 150, 152, 182 and 156 illustrated in FIG. 18.

In FIG. 20, after box 146, the routine goes to box 202. In box 202, the controller determines whether or not the accelerator pedal position S is greater than or exceeds the critical accelerator pedal S(V2). If this is the case, the routine goes to box 204. If this is not the case, the routine goes to box 212.

In box 204, the controller determines whether or not the accelerator pedal position S is less than the second accelerator pedal reference position S2 (see FIG. 19B). If this is not the case, the routine goes to box 212.

In box 212, the controller computes the reaction force increment $\Delta F$ that is expressed as $\Delta F=\Delta F(P1)=A \cdot P1^n$. In the same box 212, the controller determines the reaction force at accelerator pedal F by adding the increment $\Delta F$ to the reaction force base F0(S). In the next box 214, the controller determines servomotor command in response to the determined reaction force F and applies the command to the servomotor 32 to regulate it to generate reaction force F at the accelerator pedal. After box 214, the routine goes to box 156.

If, in box 104, the controller determines that the accelerator pedal position S is less than the second accelerator pedal reference position S2 (see FIG. 19B), the routine goes to box 206. In box 206, the controller computes the degree of risk P3 using the equation 7. In the next box 208, the controller computes the reaction force increment ΔF that is expressed as $\Delta F = \Delta F(P3) = A \cdot P3^n$. In the same box 210, the controller determines the reaction force at accelerator pedal F by adding the increment ΔF to the reaction force base F0(S). In the next box 210, the controller determines servomotor command in response to the determined reaction force F and applies the command to the servomotor 32 to regulate it to generate reaction force F at the accelerator pedal. After box 210, the routine goes to box 154. In box 154, the controller carries out intervehicle spacing control by regulating engine torque and brake torque.

While the present invention has been particularly described, in conjunction with various implementations of the present invention, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Application No. 2002-003803, filed Jan. 10, 2002, the disclosure of which is hereby incorporated by reference in its entirety.

What is claimed is:

1. A driving assist system for assisting manual effort by an operator to operate an accelerator pedal of a motor vehicle, the driving assist system comprising:
a data acquisition sub-system acquiring data including information on state of the motor vehicle and information on environment in a field around the motor vehicle;
control logic for determining the degree of risk in the field around the motor vehicle in response to the acquired data;
an actuator operable in response to a command for generating reaction force at the accelerator pedal; and
control logic for simply increasing an increment of said reaction force between a first reaction force increment and a second reaction force increment as the determined degree of risk grows from a predetermined cutoff value to a predetermined critical value to determine the command for regulating the actuator to realize the increment in said reaction force, the first reaction force increment having a first magnitude in an area of a lower limit of a predetermined range, in magnitude, of increment in said reaction force, which the vehicle operator can perceive through the sense of touch during depressing the accelerator pedal, the second reaction force increment having a second magnitude in an area of an upper limit of the predetermined range.

2. The driving assist system as claimed in claim 1, wherein the control logic for simply increasing an increment in reaction force varies the increment in said reaction force as an exponential function of the determined degree of risk.

3. The driving assist system as claimed in claim 1, wherein the control logic for determining the degree of risk determines one of the degree of first risk that is expressed by an equation including, as a variable, the reciprocal of a time headway and the degree of second risk that is expressed by an equation, including as a variable, the reciprocal of a deviation of vehicle speed of the motor vehicle from a vehicle speed limit.

4. The driving assist system as claimed in claim 1, wherein the control logic for simply increasing an increment in reaction force determines a reaction force base as a function of accelerator pedal position of the accelerator pedal, determines the increment in response to the determined degree of risk, and adding the determined increment to the determined reaction force base to determine the reaction force to be realized by the actuator.

5. The driving assist system as claimed in claim 1, wherein the control logic for simply increasing an increment in said reaction force permits the increment in reaction force up to an upper limit increment when the degree of risk has grown to the critical value, the upper limit increment being greater than the second reaction force increment.

6. The driving assist system as claimed in claim 1, further comprising a longitudinal control unit that sets, as a critical accelerator pedal position, an accelerator pedal position of the accelerator pedal when vehicle speed of the motor vehicle has matched vehicle speed of the preceding vehicle, and wherein the longitudinal control unit carries out ordinary control by regulating output torque of an engine of the motor vehicle in response to the accelerator pedal position when the accelerator pedal position is less than or equal to the critical accelerator pedal position, and carries out intervehicle spacing control with a target intervehicle spacing decreasing as the accelerator pedal position increases when the accelerator pedal position has exceeded the critical accelerator pedal position.

7. The driving assist system as claimed in claim 4, wherein further comprising a longitudinal control unit that sets, as a critical accelerator pedal position, an accelerator pedal position of the accelerator pedal when vehicle speed of the motor vehicle has matched vehicle speed of the preceding vehicle, and wherein the longitudinal control unit carries out ordinary control by regulating output torque of an engine of the motor vehicle in response to the accelerator pedal position when the accelerator pedal position is less than or equal to the critical accelerator pedal position, and carries out intervehicle spacing control with a target intervehicle spacing decreasing as the accelerator pedal position increases when the accelerator pedal position has exceeded the critical accelerator pedal position.

8. The driving assist system as claimed in claim 6, wherein the longitudinal control unit has an accelerator pedal reference position that is greater than the critical accelerator pedal position, and wherein the longitudinal control unit carries out said ordinary control by regulating said output torque of the engine of the motor vehicle in response to the accelerator pedal position to override the intervehicle spacing control when the accelerator pedal position has exceeded the accelerator pedal reference position.

9. The driving assist system as claimed in claim 8, wherein the control logic for determining the degree of risk determines the degree of first risk that is expressed by an equation including, as variables, the reciprocal of a time to collision and the reciprocal of a time headway for use in increasing the increment in said reaction force during carrying out the ordinary control, and wherein the control logic for determining the degree of risk determines the degree of second risk that is expressed by an equation, including as a variable, the reciprocal of the time headway during carrying out the intervehicle spacing control.

10. The driving assist system as claimed in claim 4, wherein the control logic for simply increasing an increment in said reaction force varies the increment in reaction force as an exponential function of the determined degree of risk.

11. The driving assist system as claimed in claim 4, wherein the control logic for determining the degree of risk determines one of the degree of first risk that is expressed by an equation, including as a variable, the reciprocal of a time headway and the degree of second risk that is expressed by an equation, including as a variable, the reciprocal of a deviation of vehicle speed of the motor vehicle from a vehicle speed limit.

12. The driving assist system as claimed in claim 4, wherein the control logic for simply increasing an increment in reaction force permits the increment in said reaction force up to an upper limit increment when the degree of risk has grown to the critical value, the upper limit increment being greater than the second reaction force increment.

13. The driving assist system as claimed in claim 7, wherein the longitudinal control unit has an accelerator pedal reference position that is greater than the critical accelerator pedal position, and wherein the longitudinal control unit carries out said ordinary control by regulating said output torque of the engine of the motor vehicle in response to the accelerator pedal position to override the intervehicle spacing control when the accelerator pedal position has exceeded the accelerator pedal reference position.

14. The driving assist system as claimed in claim 13, wherein the control logic; for determining the degree of risk determines the degree of first risk that is expressed by an equation including, as variables, the reciprocal of a time to collision and the reciprocal of a time headway for use in increasing the increment in said reaction force during carrying out the ordinary control, and wherein the control logic for determining the degree of risk determines the degree of second risk that is expressed by an equation, including as a variable, the reciprocal of the time headway during carrying out the intervehicle spacing control.

15. A driving assist method for assisting manual effort by an operator to operate an accelerator pedal of a motor vehicle, the driving assist method comprising:
   acquiring data including information on state of the motor vehicle and information on environment in a field around the motor vehicle;
   determining the degree of risk in the field around the motor vehicle in response to the acquired data;
   generating reaction force at the accelerator pedal; and
   simply increasing an increment of said reaction force between a first reaction force increment and a second reaction force increment as the determined degree of risk grows from a predetermined cutoff value to a predetermined critical value to determine the command for regulating the actuator to realize the increment in said reaction force, the first reaction force increment having a first magnitude in an area of a lower limit of a predetermined range, in magnitude, of increment in said reaction force, which the vehicle operator can perceive through the sense of touch during depressing the accelerator pedal, the second reaction force increment having a second magnitude in an area of an upper limit of the predetermined range.

16. A driving assist system for assisting manual effort by an operator to operate an accelerator pedal of a motor vehicle, the driving assist system comprising:
   means for acquiring data including information on state of the motor vehicle and information on environment in a field around the motor vehicle;
   means for determining the degree of risk in the field around the motor vehicle in response to the acquired data;
   means for generating reaction force at the accelerator pedal; and
   means for simply increasing an increment of said reaction force between a first reaction force increment and a second reaction force increment as the determined degree of risk grows from a predetermined cutoff value to a predetermined critical value to determine the command for regulating the actuator to realize the increment in said reaction force, the first reaction force increment having a first magnitude in an area of a lower limit of a predetermined range, in magnitude, of increment in said reaction force, which the vehicle operator can perceive through the sense of touch during depressing the accelerator pedal, the second reaction force increment having a second magnitude in an area of an upper limit of the predetermined range.

* * * * *